(12) United States Patent
Yoshida et al.

(10) Patent No.: US 8,367,199 B2
(45) Date of Patent: Feb. 5, 2013

(54) BIAXIALLY ORIENTED FILM

(75) Inventors: Tetsuo Yoshida, Gifu (JP); Katsuyuki Hashimoto, Gifu (JP); Ieyasu Kobayashi, Gifu (JP); Shinji Muro, Gifu (JP); Takeshi Ishida, Gifu (JP)

(73) Assignee: Teijin Dupont Films Japan Limited, Tokyo (JP)

( * ) Notice: Subject to any disclaimer, the term of this patent is extended or adjusted under 35 U.S.C. 154(b) by 0 days.

(21) Appl. No.: 13/276,465

(22) Filed: Oct. 19, 2011

(65) Prior Publication Data

US 2012/0040208 A1 Feb. 16, 2012

Related U.S. Application Data

(62) Division of application No. 10/587,392, filed as application No. PCT/JP2005/001639 on Jan. 28, 2005, now Pat. No. 8,067,105.

(30) Foreign Application Priority Data

Jan. 29, 2004 (JP) ................. 2004-021045
Jan. 29, 2004 (JP) ................. 2004-021049
May 17, 2004 (JP) ................. 2004-146244
May 17, 2004 (JP) ................. 2004-146245
May 17, 2004 (JP) ................. 2004-146247

(51) Int. Cl.
*B32B 15/085* (2006.01)
*B32B 15/09* (2006.01)
*B32B 27/08* (2006.01)
*B32B 27/32* (2006.01)
*B32B 27/36* (2006.01)

(52) U.S. Cl. ........ 428/327; 428/334; 428/335; 428/336; 428/337; 428/338; 428/339; 428/457; 428/458; 428/461; 428/480; 428/483; 428/515; 428/523; 428/910; 525/165

(58) Field of Classification Search ........................ None
See application file for complete search history.

(56) References Cited

U.S. PATENT DOCUMENTS

| | | | |
|---|---|---|---|
| 4,514,452 A | 4/1985 | Tanaka et al. | |
| 4,771,108 A | 9/1988 | Mackenzie | |
| 4,824,629 A | 4/1989 | Seitz et al. | |
| 5,074,334 A * | 12/1991 | Onodera | 137/625.41 |
| 5,089,353 A | 2/1992 | Negi et al. | |
| 5,093,758 A * | 3/1992 | Funaki et al. | 361/323 |
| 5,145,950 A | 9/1992 | Funaki et al. | |
| 5,164,479 A * | 11/1992 | Funaki et al. | 528/481 |
| 5,166,238 A | 11/1992 | Nakano et al. | |
| 5,188,930 A * | 2/1993 | Funaki et al. | 430/536 |
| 5,270,353 A * | 12/1993 | Nakano et al. | 523/214 |
| 5,283,117 A * | 2/1994 | Arai et al. | 428/343 |
| 5,374,462 A * | 12/1994 | Funaki et al. | 428/847.8 |
| 5,518,817 A * | 5/1996 | Yamasaki et al. | 428/411.1 |
| 5,525,667 A | 6/1996 | Forbes et al. | |
| 5,683,801 A * | 11/1997 | Miura | 428/318.6 |
| 5,707,719 A * | 1/1998 | Yoshinaga et al. | 428/220 |
| 5,753,354 A * | 5/1998 | Funaki et al. | 428/220 |
| 5,773,125 A * | 6/1998 | Hashimoto et al. | 428/141 |
| 5,798,172 A * | 8/1998 | Funaki et al. | 428/327 |
| 5,837,384 A * | 11/1998 | Funaki et al. | 428/521 |
| 5,907,129 A * | 5/1999 | Funaki et al. | 174/110 R |
| 6,001,446 A | 12/1999 | Nakada et al. | |
| 6,004,664 A * | 12/1999 | Sasaki et al. | 428/314.2 |
| 6,093,768 A * | 7/2000 | Nakano et al. | 524/504 |
| 6,190,753 B1 | 2/2001 | Koseki et al. | |
| 6,197,430 B1 | 3/2001 | Asakura et al. | |
| 6,235,371 B1 | 5/2001 | Mitsuhashi et al. | |
| 6,287,680 B1 | 9/2001 | Sasaki et al. | |
| 6,329,956 B1 | 12/2001 | Tateishi et al. | |
| 6,562,274 B1 | 5/2003 | Asakura et al. | |
| 6,590,705 B1 | 7/2003 | Allen et al. | |
| 6,677,031 B1 * | 1/2004 | Murooka et al. | 428/212 |
| 6,770,351 B1 | 8/2004 | Kobayashi et al. | |
| 6,773,802 B2 | 8/2004 | Kobayashi et al. | |
| 6,866,949 B2 | 3/2005 | Ota et al. | |
| 6,890,471 B2 * | 5/2005 | Kobayashi et al. | 264/290.2 |
| 7,212,372 B2 | 5/2007 | Yoshimura et al. | |
| 7,790,272 B2 | 9/2010 | Osada et al. | |
| 8,067,105 B2 * | 11/2011 | Yoshida et al. | 428/847.4 |
| 2004/0069977 A1 | 4/2004 | Oya et al. | |

FOREIGN PATENT DOCUMENTS

| | | |
|---|---|---|
| EP | 1008619 A2 | 6/2000 |
| JP | 62-259227 A | 11/1987 |
| JP | 01-182346 A | 7/1989 |
| JP | 3-86755 A | 4/1991 |
| JP | 05-212787 A | 8/1993 |
| JP | 07-320975 * | 12/1995 |
| JP | 08-013249 A | 1/1996 |
| JP | 08-039741 A | 2/1996 |
| JP | 08-048008 * | 2/1996 |
| JP | 08-048008 A | 2/1996 |

(Continued)

OTHER PUBLICATIONS

Japanese Office Action dated Sep. 27, 2011, issued in corresponding Japanese Patent Application No. 2005-142616. Japanese Office Action dated Jan. 18, 2011, issued in corresponding Japanese Patent Application No. 2005-142615.
Japanese Office Action dated Dec. 22, 2009, issued in corresponding Japanese Patent Application No. 2004-021045.
Written Opinion of the International Searching Authority in corresponding Application No. PCT/JP2005/001639.
Japanese Office Action dated Jun. 15, 2010, issued in corresponding Japanese Patent Application No. 2005-142615.
International Search Report of PCT/JP2005/001639, date of mailing Mar. 8, 2005.
Japanese Office Action dated Jul. 1, 2008, issued in corresponding Japanese Patent Application No. 2004-021049.

(Continued)

*Primary Examiner* — Vivian Chen
(74) *Attorney, Agent, or Firm* — Westerman, Hattori, Daniels & Adrian, LLP

(57) ABSTRACT

An object of the present invention is to provide a thin biaxially oriented film excellent in dimensional stability against humidity change, as well as a magnetic recording medium and a film capacitor using the same. The present invention provides a single layered or laminated biaxially oriented film comprising an aromatic polyester (a) and a polyolefin (b) having a melting point of from 230 to 280° C., wherein the ratio of the polyolefin (b) is from 5 to 30% based on the entire weight of the film, and the film thickness is from 1 to 10 μm.

20 Claims, No Drawings

FOREIGN PATENT DOCUMENTS

| | | | |
|---|---|---|---|
| JP | 8-129247 A | 5/1996 | |
| JP | 08-176329 A | 7/1996 | |
| JP | 08-222477 | * | 8/1996 |
| JP | 09-052966 A | 2/1997 | |
| JP | 11-012377 A | 1/1999 | |
| JP | 11-217448 A | 8/1999 | |
| JP | 11-315153 A | 11/1999 | |
| JP | 11-322970 A | 11/1999 | |
| JP | 2000-000946 A | 1/2000 | |
| JP | 2000-006351 A | 1/2000 | |
| JP | 2000-108201 A | 4/2000 | |
| JP | 2000-173855 A | 6/2000 | |
| JP | 2000-230065 A | 8/2000 | |
| JP | 03-086706 A | 9/2000 | |
| JP | 2000-326467 A | 11/2000 | |
| JP | 2001-034931 A | 2/2001 | |
| JP | 2002-141246 A | 5/2002 | |
| JP | 2002-338708 A | 11/2002 | |
| JP | 2003-213108 A | 7/2003 | |
| JP | 2003334905 A | 11/2003 | |
| JP | 2004-002515 A | 1/2004 | |
| WO | 97-032223 A1 | 9/1997 | |
| WO | 99-29488 A1 | 6/1999 | |
| WO | 00-76749 A1 | 12/2000 | |
| WO | 02-45959 A1 | 6/2002 | |

OTHER PUBLICATIONS

Japanese Office Action dated Oct. 20, 2009, issued in corresponding Japanese Patent Application No. 2005-142614.

Japanese Office Action dated Sep. 14, 2010, issued in corresponding Japanese Patent Application No. 2005-142616.

* cited by examiner

BIAXIALLY ORIENTED FILM

This application is a divisional of U.S. application Ser. No. 10/587,392, filed on May 11, 2007, now U.S. Pat. No. 8,067, 105, which is a National Stage of International Application No. PCT/JP2005/001639, filed on Jan. 28, 2005, which claims priority to Japanese priority application Nos. 2004-021045 and 2004-021049 filed on Jan. 29, 2004 and Japanese priority application Nos. 2004-146245, 2004-146247 and 2004-146244 filed on May 17, 2004, which are hereby incorporated by reference.

TECHNICAL FIELD

The present invention concerns a thin-walled biaxially oriented film excellent in dimensional stability to humidity change. More specifically, it relates to a thin-walled biaxially oriented film also having an excellent withstand voltage characteristic. Further, the invention relates to a biaxially oriented film suitable to use as a base film for magnetic recording media and film capacitors.

BACKGROUND ART

Since polyester films have an excellent thermal characteristic and a physical characteristic, they have been used in various application uses such as magnetic recording media, capacitors, flexible substrates, optical members, food packages, decorative use.

By the way, in magnetic recording media, particularly, magnetic recording media for use in data storage, requirement for characteristics to the base films has become severer along with increase in the capacity and the density of tapes. In magnetic recording media for data storage adopting a linear track system such as QIC, DLT and, further, high capacity super DLT, and LTO, the track pitch is made extremely narrow for attaining higher capacity of tapes. Therefore, they involve a problem of causing track deviation to generate errors in a case where dimensional changes occur in the direction of the tape width. The dimensional changes include those due to changes of temperature and humidity and due to aging shrinkage in the transverse direction which is caused upon repetitive running in high temperature and high humidity states under high tension. In a case where the dimensional change is large, it brings about track deviation to generate errors upon electromagnetic conversion. For the sake of convenience of explanation, the advancing direction when a film is formed continuously is referred to as a film-forming direction, a continuous film-forming direction, a longitudinal direction or an MD direction and, also, the direction within a plane perpendicular to the film-forming direction is sometimes referred to as a transverse direction or a width direction.

For solving such dimensional changes, JP-A No. 5-212787 discloses a biaxially oriented polyethylene-2,6-naphtalene dicarboxylate film in which the Young's modulus in the longitudinal direction (EM), the Young's modulus in the transverse direction (ET) and the ratio between both of the Young's modulus (ET/EM) are defined each within a predetermined range, and the shrinkage in the longitudinal direction, the temperature expansion coefficient in the longitudinal direction ($\alpha t$), and the humidity expansion coefficient in the longitudinal direction ($\alpha h$) are defined. Further, the pamphlet of WO No. 99/29488 discloses a biaxially oriented polyester film in which a thermal expansion coefficient $\alpha t$ ($\times 10^{-6}/°$ C.) in the transverse direction, a humidity expansion coefficient $\alpha h$ in the transverse direction ($\times 10^{-6}/\%$ RH) and shrinkage P in the transverse direction to a load when the load is applied in the longitudinal direction (ppm/g) are defined each within a predetermined range. Furthermore, the pamphlet of WO No 00/76749 discloses a biaxially oriented polyester film in which the dimensional change in the transverse direction when left under weight in the longitudinal direction, thermal expansion coefficient $\alpha t$ ($\times 10^{-6}/°$ C.) in the transverse direction, the humidity expansion coefficient $\alpha h$ in the transverse direction ($\times 10^{-6}/\%$ RH) and a shrinkage P in the transverse direction to a load when the load is applied in the longitudinal direction (ppm/g) are defined each within a predetermined range.

However, the methods proposed in the publications are attained by defining the stretching conditions and the subsequent heat setting treatment conditions within the predetermined ranges. For example, while the aging shrinkage in the transverse direction upon applying a load in the longitudinal direction can be improved by increasing the Young's modulus in the longitudinal direction of the base film, on the other hand, from a view point of the polymer characteristic and the film forming property as the Young's modulus in the longitudinal direction increases, the upper limit for the Young's modulus in the transverse direction decreases, which results in increase in the dimensional changes due to the temperature/humidity change, etc. and no drastic solution has not yet been attained.

Further, capacitors are manufactured by a method of stacking a thermoplastic resin film such as of polyethylene terephthalate or polypropylene and a thin metal film such as an aluminum foil and winding or laminating them. In recent years, along with the demand for size-reduction of electric or electronic circuits, size-reduction and mounting has been progressing also for film capacitors and further heat resistance has been required in addition to an electric characteristic. Further, in the application use for automobiles, the range of use is extended not only to the use in a driver's cab but also to the inside an engine room, and film capacitors suitable to dimensional stability at further higher temperature and higher humidity have been required in addition to the electric characteristic.

In view of the above, with an aim of solving the heat resistance of films for use in capacitors, JP-A No. 2000-173855 discloses a method of using a polyethylene-2,6-naphthalate film and, with an aim of improving the electric characteristic thereof, a method of controlling the state of crystallization, intrinsic viscosity, etc. has been proposed. However, the method has a limit in the further improvement of the electric characteristic since this is a polar polymer.

On the other hand, as a thermoplastic resin with an excellent electric characteristic, syndiotactic polystyrene polymers have been known. However, since the syndiotactic polystyrene polymers are more difficult to be formed into a film compared with polyester resins and since the obtained film tends to be torn as well, improvement for the handleability during manufacture of capacitors has been demanded.

By the way, the pamphlet of WO No. 97/32223 proposes films containing syndiotactic polystyrene and polyethylene-2,6-naphthalate. However, such films are optical materials for controlling the optical characteristic such as reflectance or transmittance and they are substantially monoaxially oriented films.

Further, JP-A No. 08-176329 proposes a void-containing polyester film in which a syndiotactic polystyrene is blended as a void former with a polyester resin and it discloses that the less deformability of the syndiotactic polystyrene at a stretching temperature gives an effect on the development of voids. However, as the thickness of the film decreases, since the effects of voids on various kinds of characteristics increase, there may be a possibility in the application use requiring thin film thickness, that various kinds of characteristics necessary for the application uses, for example, the mechanical characteristic such as Young's modulus and the withstand voltage characteristic are deteriorated.

Further, as a film formed by laminating a syndiotactic polystyrene and a polyester, JP-A No. 8-48008 describes a laminate film with the ratio of the syndiotactic polystyrene layer of 70% or more.

Further, JP-A No. 2000-326467 proposes a multi-layered laminate film in which a layer comprising polyethyelen-2,6-naphthalate and a layer comprising a syndiotactic polystyrene are alternately laminated by 11 layers or more. However, such a film intends to selectively reflect a light at a predetermined wavelength by optical interference due to the difference of refractive index between layers.

DISCLOSURE OF THE INVENTION

An object of the present invention is to provide a thin-walled biaxially oriented film excellent in the dimensional stability to humidity change.

A further object of the invention is to provide a thin-walled biaxially oriented film having an excellent withstand voltage characteristic as well.

A still further object of the invention is to provide a biaxially oriented film suitable to be used as a base film for magnetic recording media and film capacitors.

The present inventors have made earnest studies for dissolving the subjects described above and have accomplished the present invention based on the finding that use of a biaxially oriented film of a single layer or a laminate layer using an aromatic polyester and a polyolefin having a melting point of from 230 to 280° C. at a predetermined ratio can decrease the dimensional change to the humidity change while maintaining the mechanical characteristic although the thickness is thin.

That is, the invention provides a biaxially oriented film of a single layer or a laminate layer comprising a aromatic polyester (a) and a polyolefin (b) having a melting point of from 230 to 280° C., in which the ratio of the polyolefin (b) is within a range from 2 to 60% by weight based on the entire weight of the film and the film thickness is within a range from 1 to 10 μm.

Further, the invention includes a magnetic recording medium and a film capacitor using the biaxially oriented film as described above.

EFFECT OF THE INVENTION

In the biaxially oriented film of the invention, dimensional changes to the changes of humidity are within a predetermined range although the thickness is thin. Accordingly, the biaxially oriented film of the invention can be used suitably as a base film for magnetic recording media.

Further, since the magnetic recording medium of the invention causes less track deviation and is excellent in increase of density and capacitance, it is suitable, particularly, as a magnetic recording medium for use in data storage.

Further, the biaxially oriented film of the invention, has a dimensional change to the humidity changes within a predetermined range and has an excellent withstand voltage characteristic. Accordingly, the biaxially oriented film of the invention can be used suitably as a base film for film capacitors.

Further, the film capacitor according to the invention is thin-walled, excellent in the withstand voltage characteristic and suitable as film capacitors for use in electric and electronic equipment and automobile parts requiring size reduction and heat resistance.

PREFERRED EMBODIMENTS THE INVENTION (Biaxially Oriented Film)

The biaxially oriented film of the invention is a single layered film or a laminate film and, specifically, it includes, for example, the constitution to be described later. It is necessary for the biaxially oriented film of the invention that it comprises an aromatic polyester (a) and a polyolefin (b) having a melting point of from 230 to 280° C., and that the ratio of the polyolefin (b) is within a range from 2 to 60% by weight based on the entire weight of the film. In a case where the content of the polyolefin (b) is less than the lower limit, improvement for the dimensional stability to the humidity change is not sufficient. Further, in a case where the content of the polyolefin (b) exceeds the upper limit, the obtained biaxially oriented film is poor in the mechanical characteristic. A preferred ratio of the polyolefin (b) is from 3 to 55% by weight, more preferably, from 3 to 50% by weight, further preferably, from 5 to 50% by weight, and, particularly preferably, from 5 to 30% by weight. In a case where the ratio of the polyolefin (b) is less than the lower limit, improvement for the dimensional stability to the humidity change is not sufficient and, in addition, the withstand voltage characteristic are not sometimes improved sufficiently. Further, in a case where the ratio of the polyolefin (b) exceeds 50% by weight, film formation under stretching may sometimes become difficult.

In the biaxially oriented film of the invention, the film thickness is necessarily within a range from 1 to 10 μm and it is, preferably, from 2 to 10 μm, further preferably, from 2 to 7 μm and, particularly preferably, from 3 to 7 μm. In a case where the thickness exceeds the upper limit, the film thickness become excessive to shorten the tape length to be contained in a cassette in a case of use, for example, for magnetic recording media and no sufficient magnetic recording capacity can be obtained. Further, in a case of use for capacitors, it is difficult to reduce the size of the capacitor. On the other hand, below the lower limit, since the film thickness is thin, film breakage occurs frequently during film preparation, or the winding property of the film becomes sometimes poor.

(Aromatic Polyester (a))

The aromatic polyester (a) in the invention is a polymer obtained by polycondensation of a diol and an aromatic dicarboxylic acid. The aromatic dicarboxylic acid includes, for example, terephthalic acid, isophthalic acid, 2,6-naphthalene dicarboxylic acid, and 4,4'-diphenyldicarboxylic acid, and the diol includes, for example, ethylene glycol, 1,4-butanediol, 1,4-cyclohexane dimethanol, and 1,6-hexanediol. Among them, with a view point of the mechanical characteristic and the heat resistance, polyethylene terephthalate and polyethylene-2,6-naphthalene dicarboxylate are preferred, and polyethylene-2,6-naphthalene dicarboxylate is preferred.

The polyester resin in the invention may be used alone, as a copolymer with other polyester, or a mixture of two or more kinds of polyesters, and it is used preferably alone, from a view point of the mechanical characteristic and the heat resistance. Other ingredient in the copolymer or the mixture is, preferably, 10 mol % or less and, more preferably, 5 mol % or less based on the number of mols for the repetitive structural units. The copolymerization ingredient includes a diol ingredient such as diethylene glycol, neopentyl glycol, and polyalkylene glycol, and dicarboxylic acid ingredient such as adipic acid, sebacic acid, phthalic acid, isophthalic acid, terephthalic acid, and 5-sodium sulfoisophthalic acid.

The intrinsic viscosity of the polyester resin in the invention is, preferably, 0.40 or more and, more preferably, 0.40 to 0.80 in o-chlorophenol, at 35° C. In a case where the intrinsic viscosity is less than 0.4, cutting occurs frequently during film formation, or strength of products after molding fabrication sometimes becomes insufficient. On the other hand, in a case where the intrinsic viscosity exceeds 0.8, productivity upon polymerization is lowered.

The melting point of the polyester resin in the invention is, preferably, from 200 to 300° C., more preferably, from 240 to 300° C. and, particular preferably, from 260 to 290° C. In a case where the melting point is lower than the lower limit, the heat resistance of the polyester film is sometimes insufficient. Further, in a case where the melting point exceeds the upper limit, mixing with the polyolefin (b) sometimes become difficult.

The dielectric constant of the polyester resin in the invention is preferably from 2.7 to 3.4 under the condition at 23° C., 1 MHz. Such dielectric constant is a characteristic inherent to the polyester resin.

(Polyolefin (b))

The polyolefin in the invention (hereinafter sometimes referred to as polyolefin (b)) is a polyolefin having a melting point of from 230 to 280° C. The polyolefin includes, for example, poly-3-methylbutene-1, poly-4-methylpentene-1, polyvinyl-t-butane, 1,4-trans-poly-2,3-dimethylbutadiene, polyvinyl cyclohexane, polystyrene, polymethylstyrene, polydimethylstyrene, and polybutylstyrene. Among them, from a view point of the heat resistance and the mechanical characteristic, a styrene polymer having a syndiotactic structure (hereinafter sometimes referred to as syndiotactic styrene polymer) is preferred.

The syndiotactic styrene polymer in the invention is a polystyrene having a syndiotactic structure in view of a stereochemical structure and the tacticity measured by nuclear magnetic resonance method ($^{13}C$-NMR method) is 75% or more and, preferably, 85% or more for a diad (constituent unit: 2) and 30% or more and, preferably, 50% or more for a pentad (constituent unit: 5).

The syndiotactic styrene polymer includes polystyrene, poly(methyl)styrene, poly(ethylstyrene), poly(propylstyrene) and poly(butylstyrene) as poly(alkylstyrene), and poly(phenylstyrene). Among them, polystyrene, poly(p-methylstyrene), poly(m-methylstyrene), and poly(p-tertiary butylstyrene) can be preferably mentioned as examples. The syndiotactic styrene polymer in the invention may be used alone or two or more of them may be used in combination.

Further, the polymerization average molecular weight of the syndiotactic styrene polymer in the invention is preferably, 10,000 or more and, more preferably, 50,000 or more. In a case where the polymerization average molecular weight is less than the lower limit, heat resistance and mechanical characteristic are insufficient. On the other hand, the upper limit of the polymerization average molecular weight is preferably 500,000 or less. In a case where it exceeds the upper limit, it is sometimes poor in the film forming property.

The melting point of the polyolefin in the invention is preferably from 240 to 275° C. In a case where the melting point is lower than the lower limit, mixing with the aromatic polyester (a) is difficult and the heat resistance of the obtained biaxially oriented film is insufficient sometimes. Also in a case where the melting point exceeds the upper limit, mixing with the aromatic polyester becomes difficult.

The polyolefin in the invention has a dielectric constant under the condition at 23° C., 1 MHz of less than 3.0, more preferably, within a range from 2.2 to 2.9. In a case where the dielectric constant exceeds the upper limit, the withstand voltage characteristic of the biaxially oriented film is not sometimes improved sufficiently. Further, in a case where the dielectric constant is less than the lower limit, the polyolefin is sometimes poor in the fabricability.

The polyolefin in the invention preferably has dielectric loss of less than 0.001. The dielectric loss is represented by dielectric tangent (tan δ) under the condition at 23° C., 1 MHz. In a case where the dielectric loss is 0.001 or more, the insulation property is deteriorated and the withstand voltage characteristic of the obtained biaxially oriented film is not sometimes improved sufficiently.

(Single Layered Film)

The biaxially oriented film of the invention includes a single layered film as a preferred form. The single layered film is preferably formed of a thermoplastic resin composition (c) as a mixture of the aromatic polyester (a) and the polyolefin (b). In the single layered film, the ratio of the aromatic polyester (a) and the polyolefin (b) is from 40 to 98% by weight of the aromatic polyester (a) and from 2 to 60% by weight of the polyolefin (b) based on the weight of the thermoplastic resin composition (c) forming the film. The content of the aromatic polyester (a) is, preferably, from 45 to 97% by weight, more preferably, from 50 to 97% by weight, further preferably, from 50 to 95% by weight and, particularly preferably, from 70 to 95% by weight. In a case where the content of the aromatic polyester is less than the lower limit, the obtained biaxially oriented film is sometimes poor in the mechanical characteristic. Further, in a case where it is less than 50% by weight, the film formation by stretching can not sometimes be improved sufficiently. On the other hand, in a case where the content of the aromatic polyester exceeds the upper limit, improvement in the dimensional stability to the humidity change is not sometimes insufficient and the withstand voltage characteristic is not sometimes sufficient.

Further, in the thermoplastic resin composition (c), the content of the polyolefin (b) is, preferably, from 3 to 55% by weight, more preferably, from 3 to 50% by weight, further preferably, from 5 to 50% by weight, and particularly preferably, from 5 to 30% by weight. In a case where the content of the polyolefin (b) is less than the lower limit, improvement for the dimensional stability to the humidity change is not sometimes sufficient and the withstand voltage characteristic is not sometimes improved sufficiently. On the other hand, in a case where the content of the polyolefin (b) exceeds the upper limit, the obtained biaxially oriented film is sometimes poor in the mechanical characteristic. Further, in a case where it exceeds 50% by weight, film formation by stretching sometimes becomes difficult.

(Laminate Film)
(Biaxially Oriented Film(X))

The biaxially oriented film of the invention includes a laminate film as a preferred form. Such a biaxially oriented film is preferably a biaxially oriented film (X) comprising a film layer A formed from a thermoplastic resin composition (c') as a mixture of the aromatic polyester (a) and the polyolefin (b), and a film layer B comprising an aromatic polyester (a) laminated at least on one surface thereof. In the film layer A, it is further preferred that the ratio of the aromatic polyester (a) and the polyolefin (b) is within a range described below based on the weight of the thermoplastic resin composition (c') forming the film layer A. That is, in the thermoplastic resin composition (c'), the aromatic polyester (a) ranges from 5 to 95% by weight, preferably, from 7 to 93% by weight, more preferably, from 10 to 90% by weight, and particularly preferably, from 50 to 90%, and the polyolefin (b) ranges from 5 to 95% by weight, preferably, from 7 to 93% by weight, more preferably, from 10 to 90% by weight, and particularly preferably, from 10 to 50% by weight. In the thermoplastic resin composition (c'), in a case where the content of the aromatic polyester (a) exceeds the upper limit, or the content of the polyolefin (b) is less than the lower limit, the intended effect of improving the dimensional stability to the humidity change is poor. On the other hand, in a case where the content of the aromatic polyester (a) is less than the lower limit, or the content of the polyolefin (b) exceeds the upper limit, the obtained biaxially oriented laminate film is poor in the mechanical characteristic. In a case where the content of the aromatic polyester (a) exceeds 50% by weight, particularly excellent film forming property can be obtained and the adhesion with the film layer B is increased.

Further, the thickness of the film layer A relative to the thickness of the laminate film is within a range, preferably from 5 to 95%, more preferably, from 7 to 93% and, particularly preferably, from 10 to 90%. In a case where the thickness of the film layer A is less than the lower limit, the effect of improving the dimensional stability to the humidity change is poor and, on the other hand, in a case where the thickness of the film layer A exceeds the upper limit, the obtained biaxially oriented film is poor in the mechanical characteristic.

It may suffice that the film layer B is a film layer comprising substantially the aromatic polyester (a) and may also contain other thermoplastic resin, for example, the polyolefin (b) within a range not deteriorating the purpose of the invention. The content of the aromatic polyester (a) in the film layer B is preferably 90% by weight or more and, more preferably, 95% by weight or more based on the weight of the film layer B.

The existent amount of the polyolefin (b) in the biaxially oriented film (X), based on the weight of the laminate film is within a range from 2 to 60% by weight, preferably, from 3 to 55% by weight, more preferably, from 3 to 50% by weight, further preferably, from 5 to 50% by weight and, particularly preferably, from 5 to 30% by weight. In a case where the existent amount of the polyolefin (b) is less than the lower limit, the aimed effect of improving the dimensional stability to the humidity change is sometimes poor and the withstand voltage characteristic is not sometimes sufficient. On the other hand, in a case where the existent amount of the polyolefin (b) exceeds the upper limit, the obtained biaxially oriented film is sometimes poor in the mechanical characteristic. In a case where it exceeds 50% by weight, film formation by stretching sometimes becomes difficult.

The biaxially oriented film (X) includes as a preferred layer constitution, for example, (i) a 2-layered constitution in which a film layer B is laminated on one surface of the film layer A, (ii) a 3-layered constitution in which the film layer B is laminated on both surfaces of the film layer A, and (iii) a multi-layered structure in which the film layer A and the film layer B are laminated at least by 4 layers as the number for the entire layers. In the case of the 3-layered constitution (ii), curling resistance is further improved. Further, in a case of the multi-layered constitution (iii), a laminate of film layers comprising different kinds of resins can be formed into a film without worsening steps due to inter-layer delamination, etc. In a case of the multi-layered constitution (iii), a preferred number for the entire layers is 8 layers or more, more preferably, 16 layers or more and, particularly preferably, 32 layers or more. While the upper limit is not particularly restricted, it is about 500 layers and, preferably, 250 layers with a point of preventing complexity of steps. In this case, the film layer A and the film layer B are preferably laminated alternately, and a film layer comprising other resin may also be laminated within a range not deteriorating the purpose of the invention. In the case of the multi-layered constitution (iii), the thickness per one layer of the film layer A is preferably within a range from 0.02 to 1.5 µm and, further preferably, from 0.04 to 1.0 µm. On the other hand, the thickness per one layer of the film layer B is within a range, preferably, from 0.02 to 1.5 µm and further preferably, from 0.04 to 1.0 µm. In a case where the thickness per one layer of the film layer A or the film layer B is less than the lower limit, it is necessary to laminate an extremely large number of layers, tending to make the step complicate. On the other hand, in a case where the thickness per one layer of the film layer A or the film layer B exceeds the upper limit, inter-layer delamination may sometimes occur. The thickness described above can be measured by cutting the laminate film in the direction of the thickness by a microtome or the like into a micro slice piece and observing the same under transmission electron microscope.

(Biaxially Oriented Film (Y))

As another preferred form of the laminate film, a biaxially oriented film (Y) having a film layer B comprising the aromatic polyester (a) and a film layer C comprising the polyolefin (b) laminated at least on one surface thereof is preferred.

In the biaxially oriented film (Y), the film layer B comprises the aromatic polyester (a), and may be mixed or copolymerized with other resin in such a range as not deteriorating the purpose of the invention. The content of the aromatic polyester (a) in the film layer B is, preferably, 90% by weight or more and, more preferably, 95% by weight or more based on the weight of the film layer B.

In the biaxially oriented (Y), the film layer C comprises the polyolefin (b) and may be mixed or copolymerized with other resin within such a range as not deteriorating the purpose of the invention. The content of the polyolefin (b) in the film layer C, is preferably, 90% by weight or more and, more preferably, 95% by weight or more based on the weight of the film layer C.

The existent amount of the polyolefin (b) in the biaxially oriented film (Y), based on the weight of the laminated film, is within a range of from 2 to 60% by weight, preferably, from 3 to 55% weight, more preferably, from 3 to 50% by weight, further preferably, from 5 to 50% by weight, and, particularly preferably, 5 to 30% by weight. In a case where the existent amount of the polyolefin (b) is lower than the lower limit, the intended effect of improving the dimensional stability to the humidity change is sometimes poor, and the withstand voltage characteristic is not sometimes sufficient. On the other hand, in a case where the existent amount of the polyolefin (b) exceeds the upper limit, the obtained biaxially oriented film is sometimes poor in the mechanical characteristic. Further, in a case where it exceeds 50% by weight, the film formation under stretching becomes sometimes difficult.

The biaxially oriented film (Y) include as a preferred layer constitution, for example, (i) a 2-layered constitution in which a film layer B is laminated on one surface of the film layer C, (ii) a 3-layered constitution in which the film layer B is laminated on both surfaces of the film layer C, and (iii) a multi-layered structure in which the film layer C and the film layer B are laminated at least by 4 layers as the number for the entire layers. In the case of the 3-layered constitution (ii), curling resistance is further improved. Further, in a case of the multi-layered constitution (iii), a laminate of film layers comprising different kinds of resins can be formed into a film without worsening steps due to inter-layer delamination, etc. In a case of the multi-layered constitution (iii), a preferred number for the entire layers is 8 layers or more, more preferably, 16 layers or more and, particularly preferably, 32 layers or more. While the upper limit is not particularly restricted, it is about 500 layers and, preferably, 250 layers with a point of preventing complexity of steps. In this case, the film layer B and the film layer C are preferably laminated alternately, and a film layer comprising other resin may also be laminated within a range not deteriorating the purpose of the invention. In the case of the multi-layered constitution (iii), the thickness per one layer of the film layer B is, preferably, within a range from 0.02 to 1.5 μm and, further preferably, from 0.04 to 1.0 μm. On the other hand, the thickness per one layer of the film layer C is within a range, preferably, from 0.02 to 1.5 μm and further preferably, from 0.04 to 1.0 μm. In a case where the thickness per one layer of the film layer B or the film layer C is less than the lower limit, it is necessary to laminate an extremely large number of layers tending to make the step complicate. On the other hand, in a case where the thickness per one layer of the film layer B or the film layer C exceeds the upper limit, inter-layer delamination may sometimes occur. The thickness described above can be measured by cutting the laminate film in the direction of the thickness by a microtome or the like into a micro slice piece and observing the same under transmission electron microscope.

The biaxially oriented film in the invention includes, as a specific example, the single layered film and the laminate film described above, a specific example of the laminate film includes a biaxially oriented film (X) and the biaxially oriented film (Y), and a layer constitution suitable to a required characteristic can be used further. Among the layer constitutions described above, the single layered film or the biaxially oriented film (X) is preferred with a view point of layer delamination. Particularly, in a case of the single layered film, excellent dimensional stability to the humidity change due to the polyolefin (b) and excellent mechanical characteristic and film forming property due to the aromatic polyester (a) can be developed since this is in the form of a mixture. Further, in a case of the single layered film of the invention, a withstand voltage characteristic equal with that of the polyolefin (b) can be provided even when the blending amount of the polyolefin (b) is small. Further, among the biaxially oriented film (X), the excellent mechanical characteristic and the film forming property due to the aromatic polyester (a) can be developed easily in a case of the 2-layered constitution due to the further lamination of the film layer B. Further, with a view point of the curling resistance, the 3-layered constitution of the biaxially oriented film (X) is preferred.

(Dispersion State of Film Layer Comprising Thermoplastic Resin Composition)

The film layer comprising the thermoplastic resin composition (c) or the thermoplastic resin composition (c') of the invention is preferably formed of a mixture of the aromatic polyester (a) and the polyolefin (b) in which the polyolefin (b) is dispersed in an island shape. "Island dispersion shape" may be any of circular, elliptic or bar-like shape. It is more preferred in the invention that many bar-like dispersion shapes extended in the MD direction are observed and the average length of the MD direction is 20 μm or less. For the average length, the cross section in the direction of thickness parallel with the MD direction of the obtained film was observed by using an optical microscope (OPTPHOT-2, manufactured by Nikon Co.) under 200 X and measuring the length in the MD direction of the dispersion phase comprising the olefin (b) by the number of 100, to determine an average length.

The average length in the MD direction is, more preferably, 15 μm or less and, particularly preferably, 10 μm or less. In a case where the average length exceeds the upper limit, breakage tends to occur in the film stretching step. Further, as the film thickness is reduced, effect of the size of the dispersion phase becomes significant and breakage tends to occur in the film stretching step.

The method of rendering the average length in the MD direction to 20 μm or less includes a physical method by a kneading method and a chemical method such as by using a compatibilizing agent. It is more preferred to further comprising a compatibilizing agent to the thermoplastic resin composition (c) or the thermoplastic resin composition resin (c') since this can be coped with an existent apparatus.

The compatibilizing agent includes those having a function of decreasing the size of the dispersion phase comprising the polyolefin (b), in addition to the definition for usual compatibilizing agents. While there is no particular restriction so long as they have the function described above and they include, for example, a thermoplastic amorphous resin (d) having a solubility parameter (hereinafter sometimes referred to simply as SP value) between the aromatic polyester (a) and the polyolefin (b). The SP value of the aromatic polyester (a) or the polyolefin (b) is determined depending on the kind and the copolymerization ingredient of the resin to be used. For examples, the SP value calculated by a Fedor method (hereinafter simply referred to as a Fedor method) is 23.6 $(MJ/m^3)^{0.5}$ for polyethylene terephthalate, 24.8 $(MJ/m^3)^{0.5}$ (Fedor method) for polyethylene-2,6-naphthalate in the aromatic polyester (a), and 20.7 $(MJ/m^3)^{0.5}$ (Fedor method) for polystyrene in the polyolefin (b).

The thermoplastic amorphous resin (d) includes, for example, acrylic acid copolymerized polyolefin and vinyl oxazoline copolymerized polyolefin resins and the monomer constituting the olefin ingredient in the copolymer is further preferably styrene. Further, as the monomer constituting the acrylic acid ingredient in the copolymer includes, for example, acrylic acid, methacrylic acid, methyl(meth)acrylate, ethyl(meth)acrylate, and butyl(meth)acrylate. For enhancing the compatibilizing effect, an epoxy group may further be introduced to the thermoplastic amorphous resin (d).

The thermoplastic amorphous resin (d) is contained preferably within a range from 0.1 to 10% by weight based on the weight of the thermoplastic resin composition (c) or the thermoplastic resin composition (c'). The content of the thermoplastic amorphous resin (d) is, more preferably, from 0.2 to 5% by weight and, particularly preferably, from 0.3 to 3% by weight. In a case where the content is less than the lower limit, since the effect as the compatibilizing agent does not develop, the average length of the polyolefin (b) is not within the desired range and the film forming property is not sometimes improved. On the other hand, in a case where the content exceeds the upper limit, gelation due to crosslinking reaction may sometimes occur.

It is preferred that the thermoplastic resin composition (c) or the thermoplastic resin composition (c') of the invention does not have voids. The voids mean voids formed at the boundary between the aromatic polyester (a) forming the matrix phase and the polyolefin (b) forming the island phase. The void can be determined in the same method as that for determining the average length of the polyolefin (b) by using the optical microscope (OPTPHOT-2, manufactured by Nikon Co.) under 200×. Further, "does not have voids" means a state in the observation by the optical microscope described above that the number of dispersion phases where voids are observed around the dispersion phase is 10 or less, more preferably, 5 or less among the dispersion phases comprising the olefin (b) by the number of 100.

In a case where voids are present, the films sometimes tend to be cut in the film stretching step. Further, as the film thickness is reduced, the portions for the voids result in defects to sometimes deteriorate the mechanical characteristic or deteriorate the withstand voltage characteristic.

In order not to have the voids, it is preferred that the polyolefin (b) having Tg lower than the glass transition point (Tg) of the aromatic polyester (a) is selected, and that the stretching temperature of the film is Tg or higher for the aromatic polyester (a). Further, it is preferred to use a resin having a compatibility parameter approximate to that of the aromatic polyester among the polyolefins. Further, the voids can be eliminated also by containing the compatibilizing agent.

(Inert Particles)

The biaxially oriented film of the invention can contain inert particles in the film, for example, inorganic particles containing elements of group IIA, IIB, IVA, and IVB of the periodical table (for example, kaolinite, alumina, titanium oxide, calcium carbonate, and silicon dioxide), and fine particles comprising a highly heat resistant polymers such as particles of crosslinked silicone resin, crosslinked polystyrene, crosslinked acrylic particles.

In a case of incorporating the inert particles, the average particle diameter of the inert particles is preferably within a range from 0.001 to 5 µm and they are preferably contained within a range from 0.01 to 10% by weight based on the entire weight of the film.

In a case of use for magnetic recording media, a preferred average particle diameter and a content of the inert particles are as exemplified below depending on the single layered film or the laminate film.

That is, in a case of using the single layered film for the magnetic recording media, the average particle diameter of the inert particle is, preferably, from 0.01 to 1.0 µm, more preferably, from 0.03 to 0.8 µm and, particularly, from 0.05 to 0.6 µm. The content of the inert particles is, preferably, from 0.01 to 1.0% by weight, more preferably, from 0.03 to 0.8% by weight and, particularly preferably, from 0.05 to 0.5% by weight, based on the weight of the thermoplastic resin composition (c). Further, while the inert particles contained in the film may be either of a single ingredient system or multi-ingredient system, it is preferred to contain inert particles of 2-ingredient system or higher multi-ingredient system from a view point of compatibilizing the electromagnetic conversion characteristic of the tape and the winding property of the film. The surface roughness of the film surface (WRa) is preferably controlled by properly selecting the average particle diameter and the addition amount of the inert particles within the range described above.

In a case of using the biaxially oriented film (X) or the biaxially oriented film (Y) as the laminate film for the magnetic recording media, the average particle diameter of the inert particles is, preferably, from 0.01 to 0.8 µm, more preferably, from 0.02 to 0.6 µm and, particularly preferably, from 0.03 to 0.4 µm. Further, referring to the content of the inert particles, the inert particles are not contained in the surface on the side of the planar surface or, if contained, it is at most 0.5% by weight, preferably, 0.4% by weight and, more preferably, 0.3% by weight based on the weight of the film layer forming the surface on the side of the planar surface. On the other hand, for the surface on the side of the rough surface, it is preferred that the inert particles are contained by, preferably, from 0.01 to 1.0% by weight, preferably from 0.03 to 0.8% by weight and, particularly preferably, from 0.05 to 0.6% by weight based on the weight of the film layer forming the rough surface. In a case of 4 or more layered laminate structure, a film layer comprising the composition identical with that of the film layer forming the surface on the side of the rough surface may contain identical inert particles with those for the surface layer on the side of the rough surface. Further, while the inert particles contained in the film may be either of a single ingredient system or multi-ingredient system, it is preferred to contain inert particles of 2-ingredient system or higher multi-ingredient system from a view point of compatibilizing the electromagnetic conversion characteristic of the tape and the winding property of the film. The surface roughness of the film surface (WRa) is preferably controlled by properly selecting the average particle diameter and the addition amount of the inert particles within the range described above.

Further, in a case of the single layered film, the roughness on one surface and that on the other surface can not be changed easily, but in a case of the laminate film, the roughness on one surface and that on the other surface can be changed easily to provide an advantage that the electromagnetic conversion characteristic and the film running property can be compatibilized easily.

(Additive)

The biaxially oriented film in the invention may optionally contain a small amount of UV-absorbent, antioxidant, antistatic agent, light stabilizer, and heat stabilizer.

Further, the biaxially oriented film in the invention may also contain a phosphorous compound. There is no particular restriction for the kind of the phosphorous compound so long as it is a phosphorus compound that functions as the heat stabilizer and includes, for example, phosphoric acid, phosphate esters such as methyl phosphate and ethyl phosphate, phosphorous acid and phosphite esters, and among the phosphorus compounds, triethyl phosphono acetate can be mentioned particularly preferably.

A preferred content of the phosphorus compound is from 20 to 300 ppm, further, from 30 to 250 ppm and particularly, from 50 to 200 ppm as a molar concentration of the elemental phosphorus in the phosphorus compound to the entire dicarboxylic acid ingredient of the polyester. In a case where the content of the phosphorus compound is less than the lower limit, the ester exchange reaction catalyst is not deactivated completely to sometimes worsen the heat stability and deteriorate the dynamic characteristic. On the other hand, in a case where the content of the phosphorus compound exceeds the upper limit, it sometimes worsens the heat stability and deteriorates the mechanical characteristic.

(Humidity Expansion Coefficient in the Width Direction)

The biaxially oriented film of the invention has a humidity expansion coefficient αh in the transverse direction of the film preferably within a range from $0.1 \times 10^{-6}$ to $13 \times 10^{-6}$/% RH. A more preferred αh is from $0.5 \times 10^{-6}$ to $11 \times 10^{-6}$/% RH and, particularly preferably, within a range from $0.5 \times 10^{-6}$ to $10 \times 10^{-6}$/% RH.

In a case of decreasing the αh to less than the lower limit, the polyolefin (b) is present excessively, which may sometimes lower the film forming property or deteriorate the mechanical characteristic. On the other hand, in a case where the upper limit is exceeded, the film elongates due to humidity change to sometimes bring about track deviation or the like when used for the magnetic recording media. Further, in a case of use for film capacitors, the capacitor characteristic is not sometimes sufficient in the use requiring high humidity circumstance such as in an automobile engine room. Such αh can be attained by improving the Young's modulus in the direction of measurement by stretching and mixing the polyolefin together. In a case not stretched in the width direction, since the Young's modulus in the width direction is low, the humidity expansion coefficient within the range described above can not be obtained even when the polyolefins mixed together.

(Temperature Expansion Coefficient in Width Direction)

The biaxially oriented film of the invention has a temperature expansion coefficient αt in the width direction of the film preferably within a range from $-10\times10^{-6}$ to $+15\times10^{-6}/°$ C. A preferred αt is from $-8\times10^{-6}$ to $+10^{-6}/°$ C. and, particularly, with a range from $-5^{-6}\times10^{-6}$ to $+5\times10^{-6}/°$ C. In a case where αt is less than the lower limit, it causes shrinkage and, on the other hand, in a case where it exceeds the upper limit, the film elongates by the temperature change to sometimes bring about track deviation or the like when used for magnetic recording media. Further, in a case where the temperature expansion coefficient αt exceeds the upper limit, the capacitor characteristic is not sometimes sufficient in the use for capacitors requiring a high temperature circumstance such as in automatic engine rooms. Such αt can be attained by improving the Young's modulus in the measuring direction by stretching and, setting the existent amount of the polyolefin to less than the upper limit described above. In a case where it is not stretched in the width direction, since the Young's modulus in the width direction is low, the temperature expansion coefficient within the range described above can not be obtained even when the polyolefin is present being mixed together.

(Young's Modulus)

The biaxially oriented film of the invention preferably has Young's modulus of 5 GPa or more both in the film forming direction (MD direction) and the width direction (hereinafter sometimes referred to as the transverse direction or TD direction) of the film. In a case where the Young's modulus is less than the lower limit in any one of the directions, it can not sometimes endure the applied load when used as magnetic recording media or it is deformed by the temperature/humidity change even when the dimensional change by the humidity change is small. Further, the sum for the Young's modulus in the film forming direction and the width direction is preferably 22 GPa at the greatest. In a case where the sum of the Young's modulus in the film forming direction and the Young's modulus in the width direction exceeds the upper limit, the stretching factor increase excessively during film formation to sometimes result in film breakage frequently or worsen the yield of products remarkably. A preferred upper limit for the sum of Young's modulus in the film forming direction and in the width direction is 20 GPa or less and, further, 18 GPa or less.

By the way, in a case of use for linear track type magnetic tapes, it is preferred that the Young's modulus in the film forming direction is larger than the Young's modulus in the width direction with a view point of decreasing elongation in the film forming direction. A preferred Young's modulus is such that the Young's modulus in the film forming direction is larger than the Young's modulus in the width direction, the Young's modulus in the film forming direction is 6 GPa or more, 7 GPa or more and, particularly, 8 GPa or more, and the Young's modulus in the width direction is 5 GPa or more, further, 6 GPa or more and, particularly, 7 GPa or more. Further, it is preferred that the Young's modulus in the width direction is larger than the Young's modulus in the film forming direction from a view point of extremely decreasing the elongation in the width direction. A preferred Young's modulus is such that the Young's modulus in the width direction is larger than the Young's modulus in the film forming direction, the Young's modulus in the width direction is 7 GPA or more, 8 GPa or more and, particularly, 9 GPa or more, and the Young's modulus in the film forming direction is 5 GPa or more, further, 6 GPa or more and, particularly, 7 GPa or more. Furthermore, it is preferred that the difference of the Young's modulus in the film forming direction and the Young's modulus in the width direction is 2 GPa or less, particularly, 1 GPa or less, the Young's modulus in the film forming direction is 6 GPa or more, 7 GPa or more and, particularly, 8 GPa or more and the Young's modulus in the width direction is 6 GPa or more, further, 7 GPa or more and, particularly, 8 GPa or more, from the view point of decreasing the elongation both in the film forming direction and the width direction.

(Breakdown Voltage)

The biaxially oriented film of the invention has an breakdown voltage preferably in excess of 400 V/μm. The breakdown voltage is, more preferably, 410 V/μm or more, further preferably, 460 V/μm or more and, particularly preferably, 470 V/μm or more. In a case where the breakdown voltage is the lower at or less than limit, the electric characteristic when used for capacitors is not sometimes sufficient. The breakdown voltage is a value measured at a DC current of 160 V/s by using ITS-6003, name of the apparatus, manufactured by Tokyo Seiden Co., according to a plate electrode method specified in JIS C2151.

(Heat Resistant Temperature)

The biaxially oriented film of the invention preferably has a heat resistant temperature of 110° C. or higher. The heat resistant temperature is, more preferably, 115° C. or higher and, particularly preferably, 120° C. or higher. In a case where the heat resistant temperature is lower than the lower limit, the heat resistance is not sometimes insufficient when used for capacitors. The heat resistant temperature is defined as a temperature capable of withstanding for 20000 hours based on the Arrhenius plot for a relation between the half-decay time of an breakdown voltage and the temperature according to the temperature index of IEC 60216.

(Coating Film Layer)

The biaxially oriented film of the invention may also have a coating film layer on at least one surface of the outermost layer (hereinafter sometimes referred to as a coating layer). The coating film layer is obtained by coating a coating agent comprising a binder resin and a solvent to a biaxially oriented film. As the binder resin, various kinds of resins of thermoplastic resins or thermosetting resins can be used and they include, for example, polyester, polyimide, polyamide, polyester amide, polyolefin, polyvinyl chloride, poly(meth)acrylic acid ester, polyurethane, and polystyrene, as well as copolymers or mixtures thereof. Among the binder resins, the polyester copolymer is a particularly preferred example. The solvent includes, for example, organic solvents such as toluene, ethyl acetate, and methyl ethyl ketone and mixtures thereof and, further it may be water.

The coating film layer in the invention may further contain crosslinkers, surfactants and inert particles as the ingredients for forming the coating film. The surfactants include, for example, polyalkylene oxides.

In addition to the ingredient described above, the coating film layer in the invention may further contain other resins such as melamine resin, flexible polymer, filler, heat stabilizer, weather stabilizer, anti-aging agent, labeling agent, antistatic agent, slipping agent, anti-blocking agent, anti-clouding agent, dye, pigment, natural oil, synthetic oil, wax, emulsifier, hardener, and flame retardant, and the blending ratio is properly selected within such a range as not deteriorating the purpose of the invention.

The method of laminating the coating film layer on the biaxially oriented film in the invention may be either a method of coating and drying a coating agent on at least one surface of a biaxially stretched film, or a method of coating a coating agent to a stretchable film, then drying, stretching, and optionally applying a heat treatment. The stretchable film is a non-stretched film, a monoaxially stretched film, or a biaxially stretched film and, among them, a longitudinally stretched film stretched monoaxially in the film extruding direction (longitudinal direction) is exemplified particularly preferably.

Further, in a case of coating the coating agent to the film, coating in a clean atmosphere, that is, coating in the film forming step is preferred, which improves the adhesion of the coating membrane to the film. In a case of coating to the heat set film during a usual coating step, that is, in a step separated from the film manufacturing step after biaxial stretching, dirt or dust are tended to be involved.

As the method of coating the coating agent to the film, any of known coating methods can be used and, for example, a roll coating method, gravure coating method, roll brushing method, spray coating method, air knife coating method, dipping method, and curtain coating method can be used alone or in combination.

(Surface Layer)

The biaxially oriented film of the invention may also be a laminate in which a further layer is laminated on at least one surface with an aim of providing another function.

For example, in a case of use for magnetic recording media, a polyester film layer not substantially containing inert particles may be laminated to the surface of a biaxially oriented film of the invention on the side of a magnetic layer for making the side of the magnetic layer to a more planar surface. Further, for making the side of the running surface (nonmagnetic layer) to a surface more excellent in the running property, a polyester film layer in which the inert particles to be contained is made relatively larger or increased in the amount may be laminated to the surface of the biaxially oriented film of the invention on the side of the non-magnetic layer. Such a laminate film is preferred in that the electromagnetic conversion characteristic and the winding property of the film can be easily made compatible when formed as a magnetic recording medium.

Further, in a case of use for film capacitors, a layer D containing an oxygen atom-containing compound may be further provided on at least one surface of a biaxially oriented film with an aim of, for example, further improving the self-healing property. The ratio of oxygen atoms to carbon atoms on the surface measured by an X-ray photoelectron spectroscopy is preferably 10% or more and, more preferably, 15% or more. In a case where the (oxygen atom/carbon atom) ratio is less than the lower limit, the self-healing property under voltage application sometimes becomes poor. The oxygen atom containing compound includes, for example, cellulose and $SiO_2$. In the case of cellulose, it can be laminated by a method of coating while incorporating cellulose within a range from 5 to 50% by weight in the binder ingredient of the coating film layer. In the case of $SiO_2$, lamination can be made by any of the methods of vacuum vapor deposition, ion plating, or sputtering.

Further, the thickness of the layer D containing the oxygen atom-containing compound is preferably 30% or less to the entire thickness of the film. In a case where it is 30% more in the thickness, the electric characteristic such as temperature, frequency characteristic of electrostatic capacitance and dielectric tangent sometimes become poor. There is no particular restriction on the lower limit of the thickness, in a case where it is less than 0.005 μm, the effect of improving the self healing property is sometimes difficult to be obtained.

(Surface Roughness WRa)

The biaxally oriented film of the invention preferably has a surface roughness WRa (center surface average roughness) suitable to use depending on the application use.

For example, in a case of use for magnetic recording media, the surface roughness WRa (center plane average roughness) for one surface of the biaxially oriented films is preferably from 1 to 10 nm, further, from 2 to 10 nm and, particularly, from 2 to 8 nm. As the surface roughness WRa is more than 10 nm, the surface of the magnetic layer becomes rough and satisfactory electromagnetic conversion characteristic can not be obtained sometimes. On the other hand, in a case where the surface roughness WRa is less than 1 nm, since the surface becomes excessively planar, slipping on a pass roll or calendar is worsened to sometimes cause wrinkles, failing to efficient coating of the magnetic layer or failing to efficient calendaring.

Further, the surface roughness WRa on the other surface may be identical with WRa described above, or may be larger than WRa described above and from 5 to 20 nm, further, from 6 to 15 nm and, particularly, from 8 to 12 nm. In a case where the surface roughness WRa on the other surface is larger than the upper limit, the unevenness at the surface on the side of the running surface is transferred to the surface on the side of the magnetic layer to roughen the surface on the side of the magnetic layer thereby sometimes failing to obtain a satisfactory electromagnetic conversion characteristic. On the other hand, in a case where the surface roughness WRa is less than the lower limit, the surface becomes excessively planar to sometimes worsen the slipping on a pass roll or calendar, result in wrinkles and fail to effectively coat magnetic layer. In the case of the biaxially oriented laminate film, it is preferred to make the two surfaces into different forms of surface since the electromagnetic conversion characteristic and the running property can be controlled more easily.

The surface roughness WRa described above can be controlled by incorporating inert particles in the film, or by a surface treatment forming fine unevenness, for example, by a coating treatment of a coating agent.

Further, in a case of use for film capacitors, the surface roughness WRa (center plane average roughness) of the biaxially oriented film is, preferably, from 1 to 150 nm, further, from 10 to 120 nm and, particularly, from 30 to 100 nm. In a case where the surface roughness WRa is larger than the upper limit, upon fabrication into a capacitor, protrusions on the film are excessively large to make the dielectric characteristic instable due to air present between the films, or the protrusions tend to sometimes lower the breakdown voltage. On the other hand, in a case where the surface roughness WRa is less than the lower limit, the film is excessively planar to possibly cause disadvantages such as in the operation efficiency in the metal vapor deposition step and the film winding step, deformation and adhesion between the films in the capacitor heat treatment step and the pressing step and, as a result, the capacitance of the capacitor sometimes varies greatly.

(Film Forming Method)

The biaxially oriented film of the invention is preferably manufactured by the following method.

The biaxially oriented film of the invention can be manufactured, in a case of the single layered film, by using the aromatic polyester (a) and the polyolefin (b) described above as the starting material, extruding them in a molten state into a sheet-like shape, and by using known film-forming methods such as tenter method, inflation method or the like, and it includes, for example, a method of mixing the aromatic polyester (a) and the polyolefin (b) each in a predetermined amount, drying, then supplying them to an extruder heated to 300° C. and molding into a sheet-like shape by a T die.

It can be manufactured preferably by using a method of extruding at a temperature from a melting point of an aromatic polyester (Tm: ° C.) to (Tm+70)° C., and rapidly cooling to solidify into a not-extended film and further stretching the not-stretched film in a monoaxial direction (longitudinal direction or transverse direction) by a predetermined factor at a temperature from (Tg−10) to (Tg+70)° C., then stretching at a predetermined factor in the direction perpendicular to the stretching direction described above (in a case where the first step is in the longitudinal direction, the second step is in the transverse direction) at a temperature from Tg to (Tg+70)° C. and, further, applying a heat treatment. In this case, the stretching factor, the stretching temperature, the heat treatment condition, etc. are selected and decided depending on the characteristic of the film. The area stretching factor is, preferably, from 6 to 35 times and, in a case of use for capacitors, from 6 to 25 times, more preferably, from 7 to 16 times. Further, in a case for use in magnetic recording media, it is preferably by from 15 to 35 times and, further, from 20 to 30 times. The heat setting temperature may be determined within a range from 190 to 250° C. and the treatment time may be determined within a range from 1 to 60 sec. Particularly, in a case where the heat resistance is necessary, it is preferred to apply heat setting in a range from 210 to 240° C. in order to improve the dimensional stability under high temperature condition. By conducting such heat setting treatment, the heat shrinkage of the obtained biaxially oriented film at 200° C. can be from −3.5 to 3.5%, more preferably, −3 to 3% and, particularly preferably, from 0 to 3%. In a case where the heat shrinkage is within the ranges described above, wrinkles less occur to the film when fabricated into capacitors. Further, for suppressing the heat shrinkage, after applying a heat treatment at 150 to 220° C. for 1 to 60 sec in an off-line step, an annealing treatment of gradually cooling in a temperature atmosphere of from 50 to 80° C. may also be applied.

In addition to the sequential biaxial stretching method, a simultaneous biaxial stretching method may also be used. In the sequential biaxial stretching method, the number of stretching in the longitudinal direction or the transverse direction is not restricted to once but longitudinal-transverse stretching can be conducted by stretching treatment for several times and is not restricted in view of the number of times. For example, in a case for use in magnetic recording, when it is intended to further improve the mechanical property, it is preferred for subjecting the biaxially stretched film before the heat setting treatment to a heat treatment at a temperature from (Tg+20) to (Tg+70)° C., further, stretching the same in the longitudinal direction or the transverse direction at a temperature higher by 10 to 40° C. than the heat treatment temperature, successively stretching it further in the transverse direction or the longitudinal direction at a temperature higher by 20 to 50° C. than the stretching temperature thereby setting the total stretching factor to 3.0 to 7.0 times in the longitudinal direction and setting the total stretching factor to 3.0 to 6.0 times in the transverse direction.

In a case of manufacturing a 2-layered or 3-layered laminate film, a method by co-extrusion is mentioned. Preferably, starting materials constituting the respective layers are laminated in a molten state by a co-extrusion method in a die and then extruded into a sheet-like shape, or two or more kinds of molten polyesters are extruded from a die and laminated, and rapidly quenched to solidify into a laminated not-stretched film and then subjected to biaxial stretching and heat treatment by the same method and under the same condition as those for the case of the single layered film to form a laminated biaxially oriented film.

In a case of manufacturing four- or more layered laminate film, it can be manufactured, for example, by a simultaneous multi-layer extrusion method using a feed block as proposed in JP-A No. 2000-326467, paragraph 0028. That is, after drying an aromatic polyester (a) constituting the film layer B and a thermoplastic resin composition (c') constituting the film layer A or a polyolefin (b) constituting the film layer C, they are supplied to an extruder heated to about 300° C., and each of molten products is, for example, laminated alternately by using a feed block and spread in a die and extruded to form a not-stretched laminated film and then it is subjected to biaxial stretching and heat treatment by the same method under the same condition as those in the case of the single layered film to form a laminated biaxially oriented film.

Further, in a case of providing a coating layer, it is preferred to coat a desired coating solution on one surface or both surfaces of the not-stretched film or monoaxially stretched film described above.

(Magnetic Recording Medium)

The invention provides a magnetic recording medium using the biaxially oriented film of the invention described above as a base film and having a magnetic layer on one surface thereof.

The magnetic recording medium is not particularly restricted so long as the biaxially oriented film of the invention is used as the base film and includes, for example, linear track system data storage tapes such as QIC or DLT, and, S-DLT or LTO of a further higher capacity type. Since the dimensional change of the base film due to the temperature/humidity change is extremely small, a magnetic recording medium suitable to high density and high capacity causing less track deviation can be provided even when the track pitch is narrowed in order to ensure the high capacity of the tape.

(Film Capacitor)

According to the invention, a film capacitor using the biaxially oriented film of the invention as a base film and having a metal layer on at least one surface thereof is provided. The material for the metal layer is not particularly restricted and includes, for example, aluminum, zinc, nickel, chromium, tin, copper and alloys thereof. Further, in a case of providing a layer D containing an oxygen atom-containing compound for improving the self-healing property, the constitution of the film capacitor includes, for example, a base film/layer D/metal layer, or layer D/base film/metal layer.

The film capacitor is not particularly restricted so long as the biaxially oriented film of the invention is used as the base film and used for electric equipment, for example, in electric and electronic uses requiring miniaturization, or in driver's cabin or in an engine room requiring heat resistance and humidity resistance for automobile use. Further, since the base film has extremely small dimensional change upon temperature/humidity change and is excellent in the heat resistance and the voltage withstanding characteristic represented by the breakdown voltage, the film capacitor can be further miniaturized and used suitably at high temperature and high humidity.

EXAMPLE

The present invention is to be described with reference to examples. Respective characteristic values and the evaluation methods were measured and evaluated by the following methods. Parts and % in the examples mean parts by weight and % by weight, respectively.

(1) Melting Point, Glass Transition Point 10 mg of an aromatic polyester (a) or a polyolefin (b) was sealed in an aluminum pan used for measurement, which was measured at a temperature elevation rate of 20° C./min from 25° C. to 300° C. by using a differential scanning calorimeter DSC 2920 manufactured by TA instruments Co. to determine respective melting points (melting point of the aromatic polyester (a): Tma, melting point of the polyolefin (b): Tmb), and the glass transition point (glass transition point of the aromatic polyester (a): Tga, glass transition point of the polyolefin (b): Tgb).

(2) Average Particle Diameter of Inert Particles

Measurement is conducted by using a CP-50 type Centrifugal Particle Size Analyzer manufactured by Shimazu Seisakusho Co. From an accumulation curve for the particle diameter of each particle and the existent amount thereof calculated based on the obtained centrifugal settling curve, a particle diameter corresponding to 50 mass % is read and the value is defined as the average particle diameter.

(3) Humidity Expansion Coefficient ($\alpha h$)

A film sample is cut out to 15 mm length and 5 mm width such that the width direction of the film is along the measuring direction, which is set to TMA 3000 manufactured by Shinku Riko Inc. and kept in an atmosphere at 30° C. at constant humidity 30% RH and humidity 70% RH in a nitrogen atmosphere, the length of the specimen is measured in this case to calculate the humidity expansion coefficient according to the equation (1) described below. The measuring direction is along the longitudinal direction of a specimen and measurement is conducted on the specimens by the number of 10 and the average value thereof is defined as $\alpha h$.

$$\alpha h = (L_{70} - L_{30})/(L_{30} \times \Delta H) \quad (1)$$

in which
$L_{30}$: specimen length (mm) at 30% RH
$L_{70}$: specimen length (mm) at 70% RH
$\Delta H$: 40 (=70−30)% RH (4) Temperature Expansion Coefficient ($\alpha t$)

A film sample is cut out to 15 mm length and 5 mm width such that the width direction of the film is along the measuring direction, which is set to TMA 3000 manufactured by Shinku Riko Inc., applied with a pretreatment in a nitrogen atmosphere (0% RH), at 60° C. for 30 min and then the temperature is lowered to the room temperature. Then, the temperature is elevated from 25° C. to 70° C. at 2° C./min, the specimen length at each temperature is measured and the temperature expansion coefficient ($\alpha t$) is calculated according to the equation (2) described below. The measuring direction is along the longitudinal direction of the specimen, measurement is conducted 10 specimens and an average value thereof is used.

$$\alpha t = \{(L_{60} - L_{40})/(L_{40} \times \Delta T)\} + 0.5 \times 10^{-6} \quad (2)$$

in which $L_{40}$: specimen length (mm) at 40° C.
$L_{60}$ specimen length (mm) at 60° C.
$\Delta T$: 20 (=60−40)° C.
$0.5 \times 10^{-6}$: temperature expansion coefficient of quartz glass (5) Young's Modulus A film is cut out to 10 mm width and 15 cm length as a specimen and pulled by an instron type universal tensile tester with a chuck distance of 100 mm, at a tensile speed of 10 mm/min and a chart speed of 500 mm/min, and the Young's modulus is calculated from a tangent at the rising portion of the obtained load-elongation curve.

The measuring direction is along the longitudinal direction of the specimen, and the Young's modulus is measured by 10 times and an average value thereof is used.

(6) Surface Roughness (WRa)

A center surface average roughness (WRa) is determined according to the equation (3) described below using a non-contact 3-dimensional roughness meter (NT-2000) manufactured by WYKO Co., under the conditions at a measuring factor of 25, a measuring area of 246.6 μm×187.5 μm (0.0462 mm²) by a surface analysis software incorporated in the roughness meter. Measurement is repeated by 10 times and an average value thereof is used.

$$WRa = \sum_{k=1}^{M} \sum_{j=1}^{N} |Z_{jk} - \bar{Z}|/(M \cdot N) \quad (3)$$

in which $$\bar{Z} = \sum_{k=1}^{M} \sum_{j=1}^{N} Z_{jk}/(M \cdot N)$$

$Z_{jk}$ is a height on the three dimensional roughness chart at the jth and kth positions when the measuring direction (246.6 μm) and the direction perpendicular thereto (187.5 μm) are divided by M and divided by N, respectively.

(7) Thickness for Each Film

A laminate film is cut out to a trigonal shape, fixed in an embedding capsule and then embedded with an epoxy resin. It is cut in the direction parallel with the film forming direction and the direction of the thickness by a microtome (UL-TRACUT-S) into a thin slice of 50 nm thickness. Then, it is observed by using a transmission type electron microscope at an acceleration voltage of 1000 kV, photographed at a magnification factor of 10000 to 100000×, and the thickness for each of the layers was measured by photograph.

(8) Dispersibility of Olefin (b) and Void

The cross sectional thickness parallel with the MD direction of a film sample is observed by using an optical microscope (OPTPHOT-2, manufactured by Nikon Co.) at 200×, and the length in the MD direction of a dispersion phases comprising the olefin (b) by the number of 100 to determine an average length.

Further, voids around the dispersion phase comprising the olefin (b) in this case are measured and the number of dispersion phases where voids are generated is determined among the dispersion phases comprising the olefin (b) by the number of 100 and it is judged based on the following criteria.
◯: dispersion phases having voids are 10 or less.
×: dispersion phases having voids exceed 10.

(9) Heat Resistance

Film samples are used and temperature durable for 20000 hrs is determined based on Arrhenius plots for the relation between the time of the half-decay time of the breakdown voltage and the temperature according to the temperature index of IEC 60216.

(10) Dielectric Constant

Dielectric constant at 23° C., 1 MHz is measured by using a thermoplastic resin and according to JIS C2151.

(11) Dielectric Loss

Dielectric loss at 23° C., 1 MHz is measured by using a thermoplastic resin and according to JIS C2151.

(12) Breakdown Voltage

Film samples are used and breakdown voltage is measured at a DC current of 160 V/s using ITS-6003 manufactured by Tokyo Seiden Co. according to the plate electrode method specified in JIS C 2151.

(13) Film Curling Property

Film samples are used, which are sampled into 30 mm length×200 mm width, and 200 mm length×30 mm width, spontaneously left on a flat plate, respectively, and judged visually in this state by the following criteria:

○: curling is scarcely observed
Δ: curling is observed slightly
x: curling occurs remarkably

(14) Peeling Resistance

To one surface of a sample film, 6 cuts are formed the number of 6 in each of longitudinal and transverse directions at an interval of 2 mm therebetween by a cutter knife to prepare 25 grids. Then, a pressure sensitive adhesive tape of 24 mm width (trade name of products, CELLOTAPE (registered trade mark) manufactured by Nichiban Co.) is appended on both surfaces of the sample film and, after peeling the adhesive tape on the side of the grids rapidly at a peeling angle of 180°, the peeled surface was observed and evaluated by the following criteria:

○: adhesion between layers is satisfactory, with no peeled area,
Δ: adhesion between the layers is poor with less than 20% of peeled area
x: adhesion between the layers is extremely poor, with more than 20% of peeled area

(15) Film Forming Property

The state upon film formation was observed and ranked by the following criteria:

○○: continuous film formation is possible for 12 hours or more with no problems such as disconnection in view of film formation,
○: long roll can be sampled, with the condition capable of film formation being restricted
x: film can be formed only for an extremely short period of time, with the continuous film forming property being poor

(16) Track Deviation

After recording at temperature and humidity of 10° C., 10% RH by using a driving unit, LTO1 manufactured by Hewlett-Packard Co., it is run under temperature and humidity at 30° C. and 80% RH and a track deviation width of the magnetic tape to the magnetic head due to the change of temperature and humidity is measured.

A smaller absolute value for the deviation width means a better property.

(17) Humidity Resistance of Capacitor

A voltage at 100V (DC) was applied under temperature and humidity at 60° C. and 95% RH to conduct aging for 500 hours by using 4192 A LF IMPEDANCE ANALYZER, manufactured by Hewlett-Packard Co., to measure the change coefficient of static capacitance of capacitors and conduct evaluation by the following criterion. In this case, the static capacity change coefficient is represented by Δ C/C (%), in which C represents a static capacitance before aging and ΔC is a absolute value obtained by subtracting the static capacity before aging from the static capacitance after aging.

○: ΔC/C (%) is 5 or less
x: ΔC/C (%) exceeds 5

Comparative Example 1

After conducting ester exchange reaction for dimethyl naphthalene-2,6-dicarboxylate and ethylene glycol by a customary method under the presence of manganese acetate, triethyl phosphono acetate was added. Then, antimony trioxide was added and polycondensation was conducted by a customary method to obtain a polyethylene-2,6-nahpthalene dicarboxylate resin (intrinsic viscosity 0.62 (in orthochlorophenol at 35° C.), hereinafter simply referred to as PEN)). As a result of measuring the concentration for each of elements in this resin by atomic absorption method, Mn=50 ppm, Sb=300 ppm, and P=50 ppm. In PEN, silicone particles of an 0.5 μm average particle diameter was added by 0.02% by weight, and silica particles of 0.1 μm average particle diameter was added by 0.3% by weight previously based on the weight of the resin composition in the polymerization stage.

After drying the obtained PEN at 180° C. for 6 hours, it was supplied to an extruder heated to 300° C., extruded by using a T-extrusion die and solidified by rapid cooling on a casting drum surface finished at 0.3 S and kept at a surface temperature of 60° C. to obtain a not-stretched film. The not-stretched film was preheated at 75° C., further heated between low speed and high speed rolls by an infrared heater at a surface temperature of 830° C. from a portion 14 mm above and stretched by 5.1 times in the film forming direction, cooled rapidly, successively supplied to a stenter, stretched by 4.8 times in the transverse direction at 125° C. Successively, after heat setting at 240° C. for 10 sec, it was applied with a 1.0% relaxation treatment in the transverse direction at 120° C. to obtain a biaxially oriented film of 4.5 μm thickness. The Young's modulus of the obtained film was 8 GPa in the longitudinal direction and 6.5 GPa in the transverse direction.

On the other hand, a composition shown below was placed in a ball mill and after kneading and dispersion for 16 hours, 5 parts by weight of an isocyanate compound (Desmodule L, manufactured by Bayer Co.) was added and dispersed under high speed shearing for one hour to prepare a magnetic coating material.

Composition of the Magnetic Coating Material:

| | |
|---|---|
| Acicular Fe particles | 100 parts by weight |
| Vinyl chloride-vinyl acetate copolymer | 15 parts by weight |
| (Eslex 7A, manufactured by Sekisui Chemical Co.) | |
| Thermoplastic polyurethane resin | 5 parts by weight |
| Chromium oxide | 5 parts by weight |
| Carbon black | 5 parts by weight |
| Lecithin | 2 parts by weight |
| Fatty acid ester | 1 part by weight |
| Toluene | 50 parts by weight |
| Methyl ethyl ketone | 50 parts by weight |
| Cyclohexanone | 50 parts by weight |

The magnetic coating material was coated on one surface of the PEN film at a coating thickness of 0.5 μm, then applied with an orientation treatment in a DC magnetic field at 2,500 Gauss and, after heating and drying at 100° C., applied with a super calendaring treatment (line pressure: 2,000 N/cm, temperature: 80° C.) and then taken up. The taken up roll was left in an oven at 55° C. for three days.

Further, a back coat layer coating material of the following composition was coated to 1 μm thickness on the other surface of the PEN film, dried and, further, cut into 12.65 mm (=½ inch), to obtain a magnetic tape.

Composition for Backcoat Layer:

| | |
|---|---|
| Carbon black | 100 parts by weight |
| Thermoplastic polyurethane resin | 60 parts by weight |
| Isocyanate compound | 18 parts by weight |
| (Collonate L, manufactured by Nippon Polyurethane Industry Co.) | |
| Silicone oil | 0.5 parts by weight |
| Methyl ethyl ketone | 250 parts by weight |
| Toluene | 50 parts by weight |

Characteristics of the obtained biaxially oriented film and the magnetic tape are shown in Table 1 and Table 5.

Example 1

A biaxially oriented film of 4.5 μm thickness having Young's modulus in the longitudinal direction of 8 GPa, and a Young's modulus in the transverse direction of 6.5 GPa was obtained by changing the PEN of Comparative Example 1 to a thermoplastic resin composition (c1) formed by uniformly blending 90% by weight of PEN and 10% by weight of a syndiotactic polystyrene (grade: 130 ZC, manufactured by Idemitsu Petrochemical Co.) and changing the stretching factor. In the thermoplastic resin composition (c1), 0.02% by weight of silicone particles with an average particle diameter of 0.5 μm and 0.3% by weight of silica particles with an average particle diameter of 0.1 μm were previously added based on the weight of the thermoplastic resin composition (c1).

To the obtained biaxially oriented film the same procedures as those in Comparative Example 1 were repeated to prepare a magnetic tape.

The characteristics of the obtained biaxially oriented film and the magnetic tape are shown in Table 1.

Example 2

The same procedures as those in Example 1 were repeated except for using a thermoplastic resin composition (c2) in which the content of the syndiotactic polystyrene (grade; 130 ZC, manufactured by Idemitsu Petrochemical Co.) was changed from 10% by weight to 30% by weight and changing the stretching factor.

The characteristics of the obtained biaxially oriented film and the magnetic tape are shown in Table 1.

Example 3

The same procedures as those in Example 1 were repeated except for using a thermoplastic resin composition (c3) in which the content of the syndiotactic polystyrene (grade; 130 ZC, manufactured by Idemitsu Petrochemical Co.) was changed from 10% by weight to 50% by weight and changing the stretching factor.

The characteristics of the obtained biaxially oriented film and the magnetic tape are shown in Table 1.

Example 4

The same procedures as those in Example 2 were repeated except for changing the stretching factor to obtain a biaxially oriented film of 4.5 μm thickness with the Young's modulus in the longitudinal direction of 8 GPa and the Young's modulus in the transverse direction of 8 GPa.

The characteristics of the obtained biaxially oriented film on the magnetic film are shown in Table 1.

Example 5

The same procedures as those in Example 2 were repeated except for changing the stretching factor to obtain a biaxially oriented film of 4.5 μm thickness with the Young's modulus in the longitudinal direction of 5.5 GPa and the Young's modulus in the traverse direction of 12 GPa.

The characteristics of the obtained biaxially oriented film on the magnetic film are shown in Table 1.

Example 6

The same procedures as those in Example 1 were repeated except for using a thermoplastic resin composition (c4) formed by changing the PEN content from 90% by weight to 89% by weight, and adding 1% by weight of an epoxy group-containing acrylic acid copolymerized polystyrene (AL-FONE UG-4070 manufactured by Toa Gosei Co.), SP value: 21.5 (Fedor method) as a compatibilizing agent instead of the thermoplastic resin composition (c1). The SP value for PEN was 24.8 (Fedor method) and the SP value of the syndiotactic polystyrene was 20.7 (Fedor method).

The characteristics of the biaxially oriented film and the magnetic tape are shown in Table 1.

Example 7

The same procedures as those in Example 2 were repeated except for using a thermoplastic resin composition (c5) formed by changing the PEN content from 70% by weight to 69% by weight, and adding 1% by weight of an oxazoline group-containing polystyrene (EPOCROS RPS-1005, manufactured by Nippon Catalyst Co., SP value: 22.2 (Fedor method)) as a compatibilizing agent instead of the thermoplastic resin composition (c2). The SP value for PEN was 24.8 (Fedor method) and the SP value of syndiotactic polystyrene was 20.7 (Fedor method).

The characteristics of the biaxially oriented film and the magnetic tape are shown in Table 1.

Comparative Example 2

The same procedures as those in Example 1 were repeated except for using a thermoplastic resin composition (c6) formed by changing the content of the syndiotactic polystyrene (GRADE; 130 ZC, manufactured Idemitsu Petrochemical Co.) from 10% by weight to 70% by weight instead of the thermoplastic resin composition (c1), and changing the stretching factor.

The characteristics of the obtained biaxially oriented film and the magnetic tape are shown in Table 1.

TABLE 1

| | Unit | Example 1 | Example 2 | Example 3 | Example 4 | Example 5 | Example 6 | Example 7 | Comp. Example 1 | Comp. Example 2 |
|---|---|---|---|---|---|---|---|---|---|---|
| Film thickness | μm | 4.5 | 4.5 | 4.5 | 4.5 | 4.5 | 4.5 | 4.5 | 4.5 | 4.5 |
| Polyolefin ratio | wt % | 10 | 30 | 50 | 30 | 30 | 10 | 30 | 0 | 70 |
| Compatibilizing agent | wt % | | | | | | 1 | 1 | | |
| Young's modulus | | | | | | | | | | |
| Film-forming direction | GPa | 8.0 | 8.0 | 8.0 | 8.0 | 5.5 | 8.0 | 8.0 | 8.0 | 8.0 |
| Width direction | GPa | 6.5 | 6.5 | 6.5 | 8.0 | 12 | 6.5 | 6.5 | 6.5 | 6.5 |
| Temperature expansion coefficient | ppm/° C. | 7 | 7 | 8 | −2 | −8 | 7 | 7 | 7 | 8 |

TABLE 1-continued

|  | Unit | Example 1 | Example 2 | Example 3 | Example 4 | Example 5 | Example 6 | Example 7 | Comp. Example 1 | Comp. Example 2 |
|---|---|---|---|---|---|---|---|---|---|---|
| Humidity expansion coefficient | ppm/% RH | 11 | 9 | 6 | 6 | 4 | 11 | 9 | 12 | 4 |
| Track deviation | ppm | 862 | 705 | 548 | 367 | 100 | 870 | 705 | 940 | 391 |
| Film-forming property | — | ⊚ | ○ | ○ | ○ | ○ | ⊚ | ⊚ | ⊚ | x |

Example 8

After conducting ester exchange reaction for dimethyl naphthalene-2,6-dicarboxylate and ethylene glycol by a customary method under the presence of manganese acetate, triethyl phosphono acetate was added. Then, antimony trioxide was added and polycondensation was conducted by a customary method to obtain a polyethylene-2,6-nahpthalene dicarboxylate resin (PEN). As a result of measuring the concentration for each of elements in this resin by an atomic absorption method, Mn=50 ppm, Sb=300 ppm, and P=50 ppm.

After drying a thermoplastic resin composition (c7) formed by uniformly blending 90% by weight of the obtained PEN (intrinsic viscosity 0.62) and 10% by weight of a syndiotactic polystyrene (GRADE; 130 ZC, manufactured by Idemitsu Petrochemical Co.) at 180° C., it was supplied to an extruder heated to 300° C., and molded from a die at 290° C. into a sheet-like shape. Further, a not-stretched film obtained by cooling to solidify the sheet by a cooling drum at a surface temperature of 60° C. was introduced to a group of rolls heated to 140° C., stretched in the lengthwise direction (longitudinal direction) by 3.6 times and then cooled by a group of rolls at 60° C.

Successively, while holding both ends of the longitudinally stretched film by clips, it was introduced to a tenter and stretched in the direction perpendicular to the longitudinal direction (transverse direction) by 4.0 times in an atmosphere heated to a highest width stretching temperature of 150° C. Then, it was heat set in the tenter at 220° C. for 5 sec and further, applied with a 1% heat relaxation at 200° C., then, gradually cooled uniformly to a room temperature to obtain a biaxially oriented film of 5 μm thickness. The Young's modulus of the obtained film was 6.0 GPa in the longitudinal direction and 6.5 GPa in the transverse direction.

Aluminum was vacuum vapor deposited by 500 Å on one surface of the obtained biaxially oriented film and taken up into a tape of 4.5 mm width to form reels. The obtained reels were wound around being stacked to obtain a wound body, then pressed at 150° C. under 1 MPa for 5 min. Metallikon was flame-sprayed on both end faces to form an external electrode, and lead wires were welded to the metallikon to manufacture a wound film capacitor.

The characteristics of the aromatic polyester (a) and the polyolefin (b) used and the characteristics of the obtained biaxially oriented film and the capacitors are shown in Table 2.

Example 9

The same procedures as those in Example 8 were repeated except for using a thermoplastic resin composition (c8) formed by changing the content of the syndiotactic polystyrene (grade; 130 ZC, manufactured by Idemitsu Petrochemical Co.) from 10% by weight to 30% by weight, instead of the thermoplastic resin composition (c7).

The characteristics of the obtained biaxially oriented film and the film capacitor are shown in Table 2.

Example 10

A thermoplastic resin composition (c9) formed by changing PEN to a polyethylene terephthalate resin (PET) was used instead of thermoplastic resin composition (c7), dried at 170° C. for 3 hours, and supplied to an extruder heated to 280° C., and molded from a die at 290° C. into a sheet-like shape. Further, the not-stretched film obtained by cooling to solidify the sheet by a cooling drum at a surface temperature of 20° C. was introduced to a group of rolls heated to 90° C., stretched in the lengthwise direction (longitudinal direction) by 3.6 times and then cooled by a group of rolls at 20° C.

Successively, while holding both ends of the longitudinally stretched film by clips, it was introduced to a tenter and stretched in the direction perpendicular to the longitudinal direction (transverse direction) by 4.0 times in an atmosphere heated to a highest lateral stretching temperature of 120° C. Then, it was heat set in the tenter at 220° C. for 5 sec, further, applied with 1% heat relaxation at 200° C., then, cooled to a room temperature to obtain a biaxially oriented film of 5 μm thickness.

The characteristics of the aromatic polyester (a) and the polyolefin (b) used, and the characteristics of the obtained biaxially oriented film and the film capacitor are shown in Table 2.

Comparative Example 3

The same procedures as those in Example 8 were repeated except for using 100% by weight of PEN instead of the thermoplastic resin composition (c7) and not using the syndiotactic polystyrene.

The characteristics of the obtained biaxially oriented film and the film capacitor are shown in Table 2.

Comparative Example 4

The same procedures as those in Example 10 were repeated except for using 100% by weight of PET instead of the thermoplastic resin composition (c9) and not using the syndiotactic polystyrene.

The characteristics of the obtained biaxially oriented film and the film capacitor are shown in Table 2.

Comparative Example 5

The same procedures as those in Example 8 were repeated except for using a thermoplastic resin composition (c10) formed by changing the content of the syndiotactic polystyrene (GRADE; 130 ZC, manufactured by Idemitsu Petrochemical Co.) from 10% by weight to 90% by weight instead of the thermoplastic resin composition (c7).

The characteristics of the obtained biaxially oriented film and the film capacitor are shown in Table 2.

TABLE 2

|  | Unit | Example 8 | Example 9 | Example 10 | Comp. Example 3 | Comp. Example 4 | Comp. Example 5 |
|---|---|---|---|---|---|---|---|
| Film thickness | μm | 5.0 | 5.0 | 5.0 | 5.0 | 5.0 | 5.0 |
| Polyolefin ratio | Wt % | 10 | 30 | 10 | — | — | 90 |
| Aromatic polyester (a) | | | | | | | |
| Kind | | PEN | PEN | PEN | PEN | PET | PEN |
| Melting point (Tma) | °C. | 270 | 270 | 260 | 270 | 260 | 270 |
| Glass transition temperature (Tga) | °C. | 120 | 120 | 75 | 120 | 75 | 120 |
| Polyolefin(b) | | | | | | | |
| Melting point (Tmb) | °C. | 270 | 270 | 270 | — | — | 270 |
| Glass transition temperature (Tgb) | °C. | 93 | 93 | 93 | — | — | 93 |
| Dielectric constant | | 2.6 | 2.6 | 2.6 | — | — | 2.6 |
| Dielectric loss | | 0.0002 | 0.0002 | 0.0002 | — | — | 0.0002 |
| Temperature expansion coefficient | ppm/°C. | 7 | 7 | 7 | 7 | 7 | 8 |
| Humidity expansion coefficient | ppm/% RH | 11 | 9 | 11 | 12 | 12 | 2 |
| Breakdown voltage | V/μm | 460 | 480 | 410 | 400 | 450 | 490 |
| Heat resistance | °C. | 120 | 120 | 95 | 120 | 95 | 120 |
| Void | — | ○ | ○ | x | — | — | — |
| Film-forming property | — | ○○ | ○○ | x | ○○ | ○○ | x |
| Humidity resistance of capacitor | — | ○ | ○ | ○ | x | x | ○ |

Example 11

The same procedures as those in Example 8 were repeated except for using a thermoplastic resin composition (c11) formed by changing the PEN content from 90% by weight to 89% by weight, and adding 1% by weight of an oxazoline group-containing polystyrene (EPOCROS RPS-1005, manufactured by Nippon Catalyst Co., SP value: 22.2 (Fedor method)) as a compatibilizing agent instead of the thermoplastic resin composition (c7) and changing the film thickness from 5.0 to 3.0 μm. The SP value for PEN was 24.8 (Fedor method) and SP value for syndiotactic polystyrene was 20.7 (Fedor method).

The characteristics of the biaxially oriented film are shown in Table 3.

Example 12

The same procedures as those in Example 11 were repeated except for using a thermoplastic resin composition (c12) formed by changing the content of PEN from 89% by weight to 79% by weight and changing the content of the syndiotactic polystyrene (GRADE; 130 ZC, manufactured by Idemitsu Petrochemical Co.) from 10% by weight, to 20% by weight instead of the thermoplastic resin composition (c11).

The characteristics of the obtained biaxially oriented film are shown in Table 3.

Example 13

The same procedures as those in Example 11 were repeated except for using a thermoplastic resin composition (c13) formed by changing the kind of the syndiotactic polystyrene to 10 mol % methyl styrene copolymerized syndiotactic polystyrene instead of the thermoplastic resin composition (c11) and coating a water soluble coating solution of the following composition as a D layer so as to be 20 nm thickness after stretching and drying on one surface of a film after monoaxial stretching.

(Composition of Coating Layer)

| | |
|---|---|
| Binder resin A: Isophthalic acid copolymerized PEN | 50 wt % |
| Binder resin B: Hydroxypropyl cellulose (HPC-SL, Nippon Soda Co.) | 40 wt % |
| Surfactant: Alkylnonylphenyl ether | 10 wt % |

The characteristics of the obtained biaxially oriented film are shown in Table 3.

Further, a film laminate vapor deposited with aluminum to 600 Å thickness on one surface of the obtained film sample was cut into a square shape of 1 cm for each side, two sheets of them were stacked and further put between rubber plates of 2 cm for each side, and applied with a load of 2 kg. In this state, when a voltage was applied to the film laminate, to cause dielectric breakdown, self-healing property was observed.

Example 14

The same procedures as those in Example 12 were repeated except for using a thermoplastic resin composition (c13) formed by changing the content of PEN from 79% by weight to 80% by weight and changing the content of the compatibilizing agent from 1% by weight to 0% by weight instead of the thermoplastic resin composition (c12).

While it was attempted to obtain a biaxially oriented film of 3.0 μm thickness, cutting occurred extremely frequently during manufacture.

Comparative Example 6

The same procedures as those in Example 11 were repeated except for changing the content of PEN from 89% by weight to 100% by weight and not using the syndiotactic polystyrene and the compatibilizing agent, instead of the thermoplastic resin composition (c11). The characteristics of the obtained biaxially oriented film are shown in Table 3.

(c'1) constituting the film layer A based on the weight of the layer in the polymerization stage.

A biaxially oriented laminate film was obtained by repeating the same procedures as those in Comparative Example 1

TABLE 3

|  | Unit | Example 11 | Example 12 | Example 13 | Example 14 | Comp. Example 6 |
|---|---|---|---|---|---|---|
| Film thickness | μm | 3.0 | 3.0 | 3.0 | 3.0 | 3.0 |
| Polyolefin ratio | wt % | 10 | 20 | 10 | 20 | — |
| Compatibilizing agent | wt % | 1 | 1 | 1 | — | — |
| Aromatic polyester (a) | | | | | | |
| Kind | | PEN | PEN | PEN | PEN | PET |
| Melting point (Tma) | °C. | 270 | 270 | 270 | 270 | 270 |
| Glass transition temperature (Tga) | °C. | 120 | 120 | 120 | 120 | 120 |
| Polyolefin(b) | | | | | | |
| Kind | | SPS | SPS | PMS-SPS | SPS | — |
| Melting point (Tmb) | °C. | 270 | 270 | 247 | 270 | — |
| Glass transition temperature (Tgb) | °C. | 93 | 93 | 95 | 93 | — |
| Dielectric constant | | 2.6 | 2.6 | 2.6 | 2.6 | — |
| Dielectric loss | | 0.0002 | 0.0002 | 0.0002 | 0.0002 | — |
| Temperature expansion coefficient | ppm/°C. | 7 | 7 | 7 | 7 | 7 |
| Humidity expansion coefficient | ppm/% RH | 11 | 10 | 11 | 10 | 12 |
| Breakdown voltage | V/μm | 460 | 480 | 460 | — | 380 |
| Heat resistance | °C. | 120 | 120 | 120 | — | 120 |
| Average length of dispersion phase | μm | 10 | 15 | 9 | 30 | — |
| Film-forming property | — | ∘∘ | ∘∘ | ∘∘ | x | ∘∘ |

Example 15

After conducting ester exchange reaction for dimethyl naphthalene-2,6-dicarboxylate and ethylene glycol by a customary method under the presence of manganese acetate, triethyl phosphono acetate was added. Then, antimony trioxide was added and polycondensation was conducted by a customary method to obtain a polyethylene-2,6-nahpthalene dicarboxylate resin (a) (hereinafter simply referred to as PEN (a)). As a result of measuring the concentration for each of elements in this resin by atomic absorption method, Mn=50 ppm, Sb=300 ppm, and P=50 ppm.

After drying a thermoplastic resin composition (c'1) obtained by uniformly blending 25% by weight of the obtained PEN (a) (intrinsic viscosity (in orthochlorophenol, at 35° C.) 0.62) and 75% by weight of a syndiotactic polystyrehe (b) (grade: 130 ZC, manufactured by Idemitsu Petrochemical Co.) and, PEN (a) at 180° C. for 6 hrs respectively, they were supplied to an extruder heated to 300° C. and laminated in a die and extruded such that the thermoplastic resin composition (c'1) formed a film layer A and the PEN (a) formed a film layer B, by using a multi-manifold type co-extrusion die and rapidly quenched to solidify on a casting drum surface finished at 0.3 S and kept at a surface temperature of 60° C. to obtain a not-stretched film. They were extruded such that the film layer A was in contact with the casting drum, 0.15% by weight of silica particles of 0.3 μm average particle diameter and 0.1% by weight of silica particles of 0.1 μm average particle diameter were previously added to the PEN constituting the film layer B based on the weight of the layer in the polymerization stage, and 0.1% by weight of silica particles of 0.1 μm average particle diameter was previously added to the thermoplastic resin composition except for changing the stretching factor for the not-stretched film. The Young's modulus of the obtained film was 8 GPa in the longitudinal direction and 6.5 PGa in the transverse direction. The thickness of the film layer A and the film layer B in the laminate film was controlled depending on the discharge rate, which was 4 μm for the film layer A and 2 μm for the film layer B.

The same procedures as those in Comparative Example 1 were repeated to the obtained biaxially oriented laminate film, to obtain a magnetic tape.

The magnetic coating material was formed on the surface of the film layer A of the biaxially oriented laminate film, and the backcoat layer coating material was formed on the surface of the film layer B of the biaxially oriented laminate film.

Further, the ratio of the polyolefin (% by weight) was determined based on the specific gravity 1.36 g/cm$^3$ of the PEN film and the specific gravity of 1.04 g/cm$^3$ of the syndiotactic polystyrene film.

Characteristics of the obtained biaxially oriented laminate film and the magnetic tape are shown in Table 4.

Example 16

The same procedures as those in Example 15 were repeated except for using, instead of thermoplastic resin composition (c'1), a thermoplastic resin composition (c'2) in which the content of the syndiotactic polystyrene (grade; 130 ZC manufactured by Idemitsu Petrochemical Co.) was changed from 75% by weight to 10% by weight and changing the stretching factor.

The characteristics of the obtained biaxially oriented film and the magnetic tape are shown in Table 4.

Examples 17 to 19

The same procedures as those in Example 15 were repeated except for using, instead of thermoplastic resin composition (c'1), a thermoplastic resin composition (c'3) in which the content of the syndiotactic polystyrene (grade; 130 ZC manufactured by Idemitsu Petrochemical Co.) was changed from 75% by weight to 30% by weight and changing the stretching factor.

The characteristics of the obtained biaxially oriented film and the magnetic tape are shown in Table 4.

Example 20

The same procedures as those in Example 15 were repeated except for adding 0.1% by weight of silica particles of 0.1 μm average particle diameter to PEN constituting the film layer B previously in the polymerization stage, using, instead of the thermoplastic resin (c'1) constituting the film A, a thermoplastic resin composition (c'4) in which the content of the PEN(a) was changed from 25% by weight to 24% by weight, and 1% by weight of an oxazoline group-containing polystyrene (EPOCROSS RPS-1005, manufactured by Nippon Catalyst Co.) was added as a compatibilizing agent and adding 0.15% by weight of silica particles of 0.3 μm average particle diameter and 0.1% by weight of silica particles of 0.1 μm average particle diameter previously in the polymerization stage.

The magnetic coating material was formed on the surface of the film layer B of the biaxially oriented laminate film, and the back layer coating material was formed on the surface of the film layer A of the biaxially oriented laminate film.

The characteristics of the obtained biaxially oriented laminate film and the magnetic tape are shown in Table 4.

Example 21

The same procedures as those in Example 20 were repeated except for using, instead of the thermoplastic resin composition (c'4), a thermoplastic resin composition (c'5) in which the content of the syndiotactic polystyrene (grade; 130 ZC, manufactured by Idemitsu Petrochemical Co.) was changed from 75% by weight to 10% by weight and the kind of the compatibilizing agent was changed to the epoxy group-containing acrylic acid copolymerized polystyrene (ALFONE UG-4070, manufactured by Toa Gosei Co.) and changing the stretching factor.

The characteristics of the obtained biaxially oriented laminated film and the magnetic tape are shown in Table 4.

Example 22

The same procedures as those in Example 20 were repeated except for using, instead of the thermoplastic resin composition (c'4), a thermoplastic resin composition (c'6) in which the content of the syndiotactic polystyrene (grade; 130 ZC, manufactured by Idemitsu Petrochemical Co.) was changed from 75% by weight to 30% by weight and changing the stretching factor.

The characteristics of the obtained biaxially oriented laminated film and the magnetic tape are shown in Table 4.

Example 23

The same procedures as those in Example 22 were repeated except for using, instead of the 2-layered constitution of: film layer A/film layer B, a three layered constitution of: film layer B/film layer A/film layer B, changing the thickness for each of the film layers after biaxial stretching to 1.0 μm/4.0 μm/1.0 μm respectively and changing the stretching factor.

The characteristics of the obtained biaxially oriented laminate film and the magnetic tape are shown in Table 5.

Comparative Example 7

The same procedures as those in Comparative Example 1 were repeated except for using, instead of the PEN(a), a thermoplastic resin composition (c'7) in which the content of the syndiotactic polystyrene (grade; 130 ZC, manufactured by Idemitsu Petrochemical Co.) of the thermoplastic resin composition (c'1) was changed from 75% by weight to 70% by weight, and changing the stretching factor.

The characteristics of the obtained biaxially oriented laminated film and the magnetic tape are shown in Table 5.

Comparative Example 8

The not-stretched film obtained in Example 23 was stretched by 5.1 times in the film forming direction of the film to obtain a monoaxially oriented film stretched only in the film forming direction.

The characteristics of the obtained monoaxially oriented film are shown in Table 5.

TABLE 4

|  | Unit | Example 15 | Example 16 | Example 17 | Example 18 | Example 19 | Example 20 | Example 21 | Example 22 |
|---|---|---|---|---|---|---|---|---|---|
| Layer constitution |  | Laminate | Laminate | Laminate | Laminate | Laminate | Laminate | Laminate | Laminate |
| Film thickness |  |  |  |  |  |  |  |  |  |
| layer A | [μm] | 4.0 | 4.0 | 4.0 | 4.0 | 4.0 | 4.0 | 4.0 | 4.0 |
| layer B | [μm] | 2.0 | 2.0 | 2.0 | 2.0 | 2.0 | 2.0 | 2.0 | 2.0 |
| Polyolefin ratio |  |  |  |  |  |  |  |  |  |
| layer A | wt % | 75 | 10 | 30 | 30 | 30 | 75 | 10 | 30 |
| layer B | wt % | 0 | 0 | 0 | 0 | 0 | 0 | 0 | 0 |
| Laminate film | wt % | 47 | 7 | 20 | 20 | 20 | 47 | 7 | 20 |
| Young's modulus |  |  |  |  |  |  |  |  |  |
| Film forming direction | GPa | 8.0 | 8.0 | 8.0 | 8.0 | 5.5 | 8.0 | 8.0 | 8.0 |
| Width direction | Gpa | 6.5 | 6.5 | 6.5 | 8.0 | 12 | 6.5 | 6.5 | 6.5 |
| Total |  | 14.5 | 14.5 | 14.5 | 16.0 | 17.5 | 14.5 | 14.5 | 14.5 |
| Temperature expansion coefficient | ppm/° C. | 7 | 7 | 7 | −2 | −8 | 7 | 7 | 7 |

TABLE 4-continued

|  | Unit | Example 15 | Example 16 | Example 17 | Example 18 | Example 19 | Example 20 | Example 21 | Example 22 |
|---|---|---|---|---|---|---|---|---|---|
| Humidity expansion coefficient | ppm/% RH | 6 | 11 | 10 | 7 | 6 | 6 | 11 | 10 |
| Track deviation | ppm | 548 | 888 | 783 | 428 | 140 | 548 | 888 | 783 |
| Film curling property |  | Δ | ○ | Δ | Δ | Δ | Δ | ○ | Δ |
| Film forming property | — | ○ | ○○ | ○ | ○ | ○ | ○ | ○○ | ○ |

TABLE 5

|  | Unit | Example 23 | Comparative Example 1 | Comparative Example 7 | Comparative Example 8 |
|---|---|---|---|---|---|
| Layer constitution |  | Laminate | Single layered | Single layered | Laminate |
| Film thickness |  |  |  |  |  |
| layer B | [μm] | 1.0 |  |  | 1.0 |
| layer A | [μm] | 4.0 | 4.5 | 6.0 | 4.0 |
| layer B | [μm] | 1.0 |  |  | 1.0 |
| Polyolefin ratio |  |  |  |  |  |
| layer A | % | 30 | 0 | 70 | 30 |
| layer B | % | 0 | — | — | 0 |
| Laminate film | % | 20 | 0 | 70 | 20 |
| Young's modulus |  |  |  |  |  |
| Film forming direction | GPa | 8.0 | 8.0 | 8.0 | 8.0 |
| Width direction | Gpa | 6.5 | 6.5 | 6.5 | 4.5 |
| Total |  | 14.5 | 14.5 | 14.5 | 12.5 |
| Temperature expansion coefficient | ppm/° C. | 7 | 7 | 7 | 25 |
| Humidity expansion coefficient | ppm/% RH | 10 | 12 | 4 | 14 |
| Track deviation | ppm | 783 | 940 | 391 |  |
| Film curling property |  | ○ | ○ | ○ | ○ |
| Film forming property | — | ○ | ○○ | X | ○ |

Comparative Example 9

The same procedures as those in Comparative Example 1 were repeated except for changing the film thickness from 4.5 μm to 6.0 μm after biaxial stretching.

The characteristics of the obtained biaxially oriented film and the magnetic tape are shown in Table 6 and Table 7.

Example 24

A polyethylene-2,6-naphthalene dicarboxylate resin (PEN) having an intrinsic viscosity (in orthochlorophenol, at 35° C.) of 0.62 and melting point Tm of 269° C. with addition of 0.02 wt % of silicone particles of 0.5 μm average particle diameter and 0.3 wt % of silica particles of 0.1 μm average particle diameter was prepared as a resin for the film layer B. Further, a thermoplastic resin composition (c'8) with addition of 0.02 wt % of silicone particles of 0.5 μm average particle diameter and 0.3 wt % of silica particles of 0.1 μm average particle diameter, which was a mixture at a weight ratio of 50:50 of PEN having an intrinsic viscosity (orthochlorophenol, at 35° C.) of 0.62 and a melting point Tm of 269° C., with addition of 0.02 wt % of silicone particles of 0.5 μm average particle diameter and 0.3 wt % of silica particles of 0.1 μm average particle diameter, and dried at 160° C. for 5 hours, and a syndiotactic polystyrene (B) (Grade: 130 ZC, manufactured by Idemitsu Petrochemical Co.) dried at 100° C. for 3 hours was prepared as a resin for the film layer (A). The polymers of the film layers A and B were supplied to extruders and melted and, after branching the polymer of the film layer B into 25 layers and the polymer of the film layer A into 24 layers, they were merged by using a multi-layer feed block device so as to laminate the layer A and the layer B alternately, introduced while being kept in a lamination state as it was to a die, and cast on a casting drum to prepare a not-stretched laminate sheet of 49 layers in total where the layers A and the layers B were laminated alternately. In this case, the ratio of the extrusion amount of the polymers between the layer B and the layer A was controlled to 8:2, and they were laminated such that the layer B was present on both of the surfaces. The not-stretched laminate sheet extruded from the die was rapidly cooled to solidify on a casting drum surface finished to 0.3 S and kept at a surface temperature of 60° C. into a not-stretched film.

The same procedures as those in Comparative Example 1 were repeated to the laminated not-stretched film except for changing the stretching factor, to obtain a biaxially oriented laminate film having a Young's modulus of 8 GPa in the longitudinal direction and a Young's modulus of 6.5 GPa in the transverse direction. The thickness of the film layer A and the film layer B in the laminate film was controlled by the discharge amount, in which the film layer B had a thickness per one layer of 0.192 μm and 4.8 μm in total, while the film layer A had a thickness per one layer of 0.050 μm and 1.2 μm in total.

Then, the same procedures as those in Comparative Example 1 were repeated to obtain a magnetic recording medium.

The ratio of the polyolefin (wt %) was determined based on the specific gravity of 1.36 g/cm³ of the PEN film and the specific gravity of 1.04 g/cm³ of the syndiotactic polyethylene film.

The characteristics of the obtained biaxially oriented laminate film and the magnetic tape are shown in Table 6.

Example 25

The same procedures as those in Example 24 were repeated except for changing the inert particles contained in the resin of the film layer A and the film layer B to 0.1% by weight of the silica particles of 0.1 μm average particle diameter, changing the thermoplastic resin composition (c'8) to a thermoplastic resin composition (c'9) as a mixture at a 40:60 ratio by weight of PEN and syndiotactic polystyrene, and changing the stretching factor and the discharge rate of each of the layers in Example 24, to obtain a biaxially stretched laminate film having a Young's modulus of 8 GPa in the longitudinal direction, a Young's modulus of 6.5 GPa in the transverse direction, the thickness per one layer of the film layer B of 0.168 μm, the total for the thickness of the film layer B of 4.2 μm, the thickness per one layer of the film layer A of 0.075 μm and the total for the thickness of the film layer A of 1.8 μm.

Then, the same procedures as those in Comparative Example 1 were repeated to obtain a magnetic recording medium.

The characteristics of the obtained biaxially oriented laminate film and the magnetic tape are shown in Table 6.

Example 26

Then, the same procedures as those in Example 24 were repeated except for changing the thermoplastic resin composition (c'8) to a thermoplastic resin composition (c'10) which was a mixture at a 60:40 ratio by weight of PEN and syndiotactic polystyrene (B), and changing the stretching factor and the discharge rate for each of the layers in Example 24, to obtain a biaxially oriented laminate film having a Young's modulus of 8 GPa in the longitudinal direction, a Young's modulus of 6.5 GPa in the transverse direction, a thickness per one layer of the film layer B of 0.120 μm, the total thickness for the film layers B of 3.0 μm, the thickness per one layer of the film layers A of 0.125 μm and the total thickness for the film layers A of 3.0 μm.

Then, the same procedures as those in Comparative Example 1 were repeated to obtain a magnetic recording medium.

The characteristics of the obtained biaxially oriented laminate film and the magnetic tape are shown in Table 6.

Example 27

The same procedures as those in Example 24 were repeated except for changing the stretching factor and the discharge rate for each of the layers, and changing the number of layers to 9 layers for the film layer B and to 8 layers for the film layer A, with the film layer B being disposed on both ends in Example 24, to obtain a biaxially oriented laminate film having a Young's modulus of 8 GPa in the longitudinal direction, a Young's modulus of 6.5 GPa in the transverse direction, and the thickness per one layer of film B of 0.333 μm, the total thickness for the film layers B of 3.0 μm, the thickness per one layer of the film A of 0.375 μm, and the total thickness of the film layers A of 3.0 μm.

Then, the same procedures as those in Comparative Example 1 were repeated to obtain a magnetic recording medium.

The characteristics of the obtained biaxially oriented laminate film and the magnetic tape are shown in Table 6.

Example 28

The same procedures as those in Example 24 were repeated except for changing the stretching factor and the discharge rate for each of the layers, and changing the number of layers to 49 layers for the film layer B and to 48 layers for the film layer A, with the film layer B being disposed on both ends in Example 24, to obtain a biaxially oriented laminate film having a Young's modulus of 8 GPa in the longitudinal direction, a Young's modulus of 6.5 GPa in the transverse direction, and the thickness per one layer of film B of 0.037 μm, the total thickness for the film layers B of 1.8 the thickness per one layer of the film A of 0.088 μm, and the total thickness for the film layers A of 4.2 μm.

Then, the same procedures as those in Comparative Example 1 were repeated to obtain a magnetic recording medium.

The characteristics of the obtained biaxially oriented laminate film and the magnetic tape are shown in Table 6.

Example 29

The same procedures as those in Example 24 were repeated except for changing the stretching factor and the discharge rate for each of the layers in Example 26 to obtain a biaxially oriented laminate film having a Young's modulus of 8 GPa in the longitudinal direction, and a Young's modulus of 8 GPa in the transverse direction.

Then, the same procedures as those in Comparative Example 1 were repeated to obtain a magnetic recording medium.

The characteristics of the obtained biaxially oriented laminate film and the magnetic tape are shown in Table 6.

Example 30

The same procedures as those in Example 24 were repeated except for changing the stretching factor and the discharge rate for each of the layers in Example 26 to obtain a biaxially oriented laminate film having a Young's modulus of 5.5 GPa in the longitudinal direction, and a Young's modulus of 12 GPa in the transverse direction.

Then, the same procedures as those in Comparative Example 1 were repeated to obtain a magnetic recording medium.

The characteristics of the obtained biaxially oriented laminate film and the magnetic tape are shown in Table 6.

Comparative Example 10

The same procedures as those in Example 24 were repeated except for changing the inert particles contained in the resin of the film layer A and the film layer B to 0.02% by weight of silicone particles of 1.2 μm average particle diameter and 0.4% by weight of silica particles of 0.1 μm average particle diameter, changing the thermoplastic resin (c'8) to a thermoplastic resin composition (c'11) which comprises only the syndiotactic polystyrene (b), and changing the stretching factor and the discharge rate for each of the layers, to obtain a biaxially oriented laminate film having a Young's modulus of 8 GPa in the longitudinal direction, a Young's modulus of 6.5 GPa in the transverse direction, a thickness per one layer of the film layer B of 0.072 μm, the total thickness for the film layers B of 1.8 μm, the thickness per one layer of the film layer B of 0.175 μm and the total thickness for the film layers A of 4.2 μm.

Then, the same procedures as those in Comparative Example 1 were repeated to obtain a magnetic recording medium.

The characteristics of the obtained biaxially oriented laminate film and the magnetic tape are shown in Table 6.

TABLE 6

| | Unit | Example 24 | Example 25 | Example 26 | Example 27 | Example 28 | Example 29 | Example 30 | Comp. Example 9 | Comp. Example 10 |
|---|---|---|---|---|---|---|---|---|---|---|
| Layer constitution | | Multi-layered | Multi-layered | Multi-layered | Multi-layered | Multi-layered | Multi-layered | Multi-layered | Single layered | Multi-layered |
| Film thickness | | 6.0 | 6.0 | 6.0 | 6.0 | 6.0 | 6.0 | 6.0 | 6.0 | 6.0 |
| Per one layer B | μm | 0.192 | 0.168 | 0.120 | 0.333 | 0.037 | 0.120 | 0.120 | — | 0.072 |
| Total for layers B | μm | 4.8 | 4.2 | 3.0 | 3.0 | 1.8 | 3.0 | 3.0 | 6.0 | 1.8 |
| Per one layer A | μm | 0.050 | 0.075 | 0.125 | 0.375 | 0.088 | 0.125 | 0.125 | — | 0.175 |
| Total for layers A | μm | 1.2 | 1.8 | 3.0 | 3.0 | 4.2 | 3.0 | 3.0 | — | 4.2 |
| Number of layers | | | | | | | | | | |
| layer B | — | 25 | 25 | 25 | 9 | 49 | 25 | 25 | — | 25 |
| layer A | — | 24 | 24 | 24 | 8 | 48 | 24 | 24 | — | 24 |
| Total layer | — | 49 | 49 | 49 | 17 | 97 | 49 | 49 | — | 49 |
| Thickness ratio for layer | | | | | | | | | | |
| Layer B/layer A | — | 8/2 | 7/3 | 5/5 | 5/5 | 3/7 | 5/5 | 5/5 | 10/— | 3/7 |
| Ratio of aromatic polyester | | | | | | | | | | |
| Film layer A | wt % | 50 | 40 | 60 | 50 | 25 | 60 | 60 | — | 0 |
| Laminate film | wt % | 91 | 84 | 81 | 77 | 49 | 81 | 81 | — | 36 |
| Ratio of polyolefin | | | | | | | | | | |
| Film layer A | wt % | 50 | 60 | 40 | 50 | 75 | 40 | 40 | — | 100 |
| Laminate film | wt % | 9 | 16 | 19 | 23 | 51 | 19 | 19 | — | 64 |
| Young's modulus | | | | | | | | | | |
| Film forming direction | GPa | 8.0 | 8.0 | 8.0 | 8.0 | 8.0 | 8.0 | 5.5 | 8.0 | 8.0 |
| Width direction | GPa | 6.5 | 6.5 | 6.5 | 6.5 | 6.5 | 8.0 | 12 | 6.5 | 6.5 |
| Temperature expansion coefficient | ppm/° C. | 7 | 7 | 7 | 7 | 8 | −2 | −8 | 7 | 8 |
| Humidity expansion coefficient | ppm/% RH | 11 | 10 | 10 | 9 | 6 | 7 | 5 | 12 | 4 |
| Track deviation | ppm | 862 | 799 | 783 | 744 | 528 | 428 | 140 | 940 | 391 |
| Peeling resistance | — | ○ | ○ | ○ | ○ | ○ | ○ | ○ | — | x |
| Film forming property | — | ○ | ○ | ○ | ○ | ○ | ○ | ○ | ○○ | x |

Example 31

Polyethylene-2,6-naphthalene dicarboxylate resin (PEN) having an intrinsic viscosity (in orthochlorophenol at 35° C.) of 0.62 and a melting point (Tm) of 269° C., with addition of 0.02 wt % of silicone particles of 0.5 μm average particle diameter and 0.3 wt % of silica particles of 0.1 μm average particle diameter was prepared as a resin for the film B. Further, a syndiotactic polystyrene (grade: 130 ZC manufactured by Idemitsu Petrochemical Co.) with addition of 0.02 wt % of silicone particles of 0.5 μm average particle diameter and 0.3 wt % of silica particles of 0.1 μm average particle diameter was prepared as a resin for the film layer C. After drying the polymer for the film layer B at 160° C. for 3 hours and the polymer for the film layer C at 100° C. for 3 hours, they were supplied to extruders and melted. After branching the polymer of the film layer B into 25 layers and the polymer of the film layer C into 24 layers, they were merged by using a multi-layer feed block device so as to laminate the layer B and the layer C alternately, introduced while being kept in a lamination state as it was to a die, and cast on a casting drum to prepare not-stretched laminate sheet with the 49 layers in total where the layer B and the layer C are laminated alternately. In this case, the ratio of the extruding amount of the polymer between the layer B and the layer C is controlled to 9:1, and they were laminated such that the layers B were present on both of the surfaces. The not-stretched laminate sheet extruded from the die was rapidly cooled to solidify on a casting drum surface finished to 0.3 S and kept at a surface temperature of 60° C. into a not-stretched film.

The same procedures as those in Comparative Example 1 were repeated except for changing the stretching factor to the not-stretched laminate film, to obtain a biaxially oriented laminate film having a Young's modulus of 8 GPa in the longitudinal direction and a Young's modulus of 6.5 GPa in the transverse direction. The thickness of the film layer B and the film layer C in the laminate film was controlled by the discharge rate, in which the film layer B had a thickness per one layer of 0.216 μm and 5.4 μm in total, the film layer C had a thickness per one layer of 0.025 μm and 0.6 μm in total.

Then, the same procedures as those in Comparative Example 1 were repeated to obtain a magnetic recording medium.

The ratio of polyolefin (wt %) was determined based on the specific gravity of 1.36 g/cm$^3$ of the PEN film and the specific gravity of 1.04 g/cm$^3$ of the syndiotactic polyethylene film.

The characteristics of the obtained biaxially oriented laminate film and the magnetic tape are shown in Table 7.

Example 32

Same procedures as those in Example 31 were repeated except for changing inert particles contained in the resin for the film layer B and the film layer C to 0.1% by weight of silica particles of 0.1 μm average particle diameter and changing the stretching factor and the discharge rate for each of the layers in Example 31, to obtain a biaxially oriented laminate film having a Young's modulus of 8 PGa in the longitudinal direction and a Young's modulus of 6.5 GPa in the transverse direction, and the thickness per one layer of the film layer B of 0.168 μm, the total thickness for the film layer B of 4.2 μm, and the thickness per one layer of the film layer C of 0.075 μm and the total thickness for the film layer B of 1.8 μm.

Then, the same procedures as those in Comparative Example 1 were repeated to obtain a magnetic recording medium.

The characteristics of the obtained biaxially oriented laminate film and the magnetic tape are shown in Table 7.

Example 33

The same procedures as those in Example 31 were repeated except for changing the stretching factor and the discharge rate for each of the layers in Example 31, to obtain a biaxially oriented laminate film having a Young's modulus of 8 GPa in the longitudinal direction, a Young's modulus of 6.5 GPa in the transverse direction, and the thickness per one layer of film layer B of 0.120 μm, the total thickness for the film layer B of 3.0 μm, the thickness per one layer of the film layer C of 0.125 μm and the total thickness for the film layer B of 3.0 μm.

Then, the same procedures as those in Comparative Example 1 were repeated to obtain a magnetic recording medium.

The characteristics of the obtained biaxially oriented laminate film and the magnetic tape are shown in Table 7.

Example 34

The same procedures as those in Example 31 were repeated except for changing the stretching factor and the discharge rate for each of the layers, and changing the number of layers as 9 layers for the film layer B and 8 layers for the film layer C with the film layers B being disposed on both ends, to obtain a biaxially oriented laminate film having a Young's modulus of 8 GPa in the longitudinal direction, a Young's modulus of 6.5 GPa in the transverse direction, the thickness per one layer of the film layer B of 0.533 μm, the total thickness for the layer B of 4.8 μm, the thickness per one layer of the film layer C of 0.15 μm, and the total thickness for the film layer C of 1.2 μm.

Then, the same procedures as those in Comparative Example 1 were repeated to obtain a magnetic recording medium.

The characteristics of the obtained biaxially oriented laminate film and the magnetic tape are shown in Table 7.

Example 35

The same procedures as those in Example 31 were repeated except for changing the stretching factor and the discharge rate for each of the layers, and changing the number of layers as 49 layers for the film layer B and 48 layers for the film layer C with the film layers B being disposed on both ends, to obtain a biaxially oriented laminate film having a Young's modulus of 8 GPa in the longitudinal direction, a Young's modulus of 6.5 GPa in the transverse direction, the thickness per one layer of the film layer B of 0.073 μm, the total thickness for the film layers B of 3.6 μm, the thickness per one layer for the film layer C of 0.050 μm, the total thickness for the film layers C of 2.4 μm.

Then, the same procedures as those in Comparative Example 1 were repeated to obtain a magnetic recording medium.

The characteristics of the obtained biaxially oriented laminate film and the magnetic tape are shown in Table 7.

Example 36

The same procedures as those in Example 32 were repeated except for changing the stretching factor and the discharge rate for each of the layers to obtain a biaxially oriented laminate film having a Young's modulus of 8 GPa in the longitudinal direction and a Young's modulus of 8 GPa in the transverse direction.

Then, the same procedures as those in Comparative Example 1 were repeated to obtain a magnetic recording medium.

The characteristics of the obtained biaxially oriented laminate film and the magnetic tape are shown in Table 7.

Example 37

The same procedures as those in Example 32 were repeated except for changing the stretching factor and the discharge rate for each of the layers to obtain a biaxially oriented laminate film having a Young's modulus of 5.5 GPa in the longitudinal direction and a Young's modulus of 12 GPa in the transverse direction.

Then, the same procedures as those in Comparative Example 1 were repeated to obtain a magnetic recording medium.

The characteristics of the obtained biaxially oriented laminate film and the magnetic tape are shown in Table 7.

Comparative Example 11

The same procedures as those in Example 31 were repeated except for changing the inert particles contained in the resin for the film layer B to 0.02% by weight of silicone particles of 1.2 μm average particle diameter, and 0.4% by weight of silica particles of 0.1 μm average particle diameter, and changing the stretching factor and the discharge rate for each of the layers in Example 31 to obtain a biaxially oriented laminate film having a Young's modulus of 8 GPa in the longitudinal direction and a Young's modulus of 6.5 GPa in the transverse direction, a thickness per one layer of the film layer B of 0.072 μm, total thickness for the film layer B of 1.8 μm, a thickness per one layer of the film layers C of 0.175 μm, and the total for the thickness of the film layer C of 4.2 μm.

Then, the same procedures as those in Comparative Example 1 were repeated to obtain a magnetic recording medium.

The characteristics of the obtained biaxially oriented laminate film and the magnetic tape are shown in Table 7.

TABLE 7

| | Unit | Example 31 | Example 32 | Example 33 | Example 34 | Example 35 | Example 36 | Example 37 | Comp. Example 9 | Comp. Example 11 |
|---|---|---|---|---|---|---|---|---|---|---|
| Layer constitution | | Multi-layered | Multi-layered | Multi-layered | Multi-layered | Multi-layered | Multi-layered | Multi-layered | Single layered | Multi-layered |
| Film thickness | | 6.0 | 6.0 | 6.0 | 6.0 | 6.0 | 6.0 | 6.0 | 6.0 | 6.0 |
| Per one layer B | μm | 0.216 | 0.168 | 0.120 | 0.533 | 0.073 | 0.168 | 0.168 | — | 0.072 |

TABLE 7-continued

| | Unit | Example 31 | Example 32 | Example 33 | Example 34 | Example 35 | Example 36 | Example 37 | Comp. Example 9 | Comp. Example 11 |
|---|---|---|---|---|---|---|---|---|---|---|
| Total for layer B | μm | 5.4 | 4.2 | 3.0 | 4.8 | 3.6 | 4.2 | 4.2 | 6.0 | 1.8 |
| Per one layer C | μm | 0.025 | 0.075 | 0.125 | 0.150 | 0.050 | 0.075 | 0.075 | — | 0.175 |
| Total for layers C | μm | 0.6 | 1.8 | 3.0 | 1.2 | 2.4 | 1.8 | 1.8 | — | 4.2 |
| Number of layers | | | | | | | | | | |
| Layer B | — | 25 | 25 | 25 | 9 | 49 | 25 | 25 | — | 25 |
| Layer C | — | 24 | 24 | 24 | 8 | 48 | 24 | 24 | — | 24 |
| Total layer | — | 49 | 49 | 49 | 17 | 97 | 49 | 49 | — | 49 |
| Ratio of polyolefin | wt % | 8 | 25 | 43 | 16 | 34 | 25 | 25 | 0 | 64 |
| Young's modulus | | | | | | | | | | |
| Film forming direction | GPa | 8.0 | 8.0 | 8.0 | 8.0 | 8.0 | 8.0 | 5.5 | 8.0 | 8.0 |
| Width direction | GPa | 6.5 | 6.5 | 6.5 | 6.5 | 6.5 | 8.0 | 12 | 6.5 | 6.5 |
| Temperature expansion coefficient | ppm/° C. | 7 | 7 | 8 | 7 | 7 | −2 | −8 | 7 | 8 |
| Humidity expansion coefficient | ppm/% RH | 11 | 9 | 6 | 10 | 7 | 6 | 4 | 12 | 4 |
| Track deviation | ppm | 862 | 705 | 548 | 783 | 626 | 367 | 100 | 940 | 391 |
| Film forming property | — | ∘∘ | ∘∘ | ∘ | ∘∘ | ∘∘ | ∘ | ∘∘ | ∘∘ | x |

Example 38

A polyethylene-2,6-naphthalene dicarboxylate resin (PEN) was obtained by the same method as in Comparative Example 1 except for changing the spherical silica of 0.3 μm average particle diameter as inert particles to 0.1% by weight. After drying the obtained PEN (intrinsic viscosity: 0.62) at 180° C. for 6 hours, it was supplied to an extruder heated to 300° C. On the other hand, as the polyolefin (b), a syndiotactic polystyrene (grade: 130 ZC, manufactured by Idemitsu Chemical Co.) was supplied to another extruder heated to 280° C. and in a state melted, respectively, the PEN layer B and the syndiotactic polystyrene layer C were laminated alternately inside the die to 49 layers being represented as B/C/B---B/C/B, and they were molded in a state being kept in the laminate structure from a die into a sheet-like shape. Further, a not-stretched film cooled and solidified from the sheet by a cooling drum at a surface temperature of 60° C. was introduced to a group of rolls heated to 140° C. and, after stretching by 3.6 times in the longitudinal direction (MD direction), it was cooled by a group of rolls at 60° C.

Successively, the longitudinally stretched film was introduced into a tenter while being held at both ends by clips and stretched by 4.0 times in the direction perpendicular to the longitudinal direction (transverse direction) in an atmosphere heated to 150° C. as the highest transverse stretching temperature. Then, heat setting was applied in the tenter at 220° C. for 5 sec and, after being subjected to 1% heat relaxation at 200° C., it was gradually cooled uniformly to a room temperature to obtain a biaxially oriented laminate film of 5 μm thickness. The average thickness for each of the layers was 0.1 μm.

The ratio of the polyolefin (weight %) was determined based on the specific gravity of 1.36 g/cm³ of the PEN film and the specific gravity of 1.04 g/cm³ of the syndiotactic polystyrene film.

The characteristics of the aromatic polyester resin (a) and the polyolefin (b) used and the characteristics of the obtained biaxially oriented laminated film are shown in Table 8.

Example 39

The same procedures as those in Example 38 were repeated except for changing the laminate structure from 49 layers to a 5-layered structure represented by B/C/B/C/B, to obtain a biaxially oriented laminate film of 5 μm thickness. The average thickness for each of the layers was 1 μm.

The characteristic of the obtained biaxially oriented laminate film is shown in Table 8.

Example 40

The same procedures as those in Example 38 were repeated except for changing the laminate structure of the PEN layer B and the syndiotactic polystyrene layer C from 49 layers to 2 layers represented by B/C, to obtain a biaxially oriented film of 5 μm thickness. The average thickness for each of the layers was 3 μm for the layer B and 2 μm for the layer C.

The characteristics of the obtained biaxially oriented film are shown in Table 8. While the film of this example satisfied heat resistance and breakdown voltage, curling occurs and inter-layer peeling was observed for the film.

Comparative Example 12

The same procedures as those in Example 38 were repeated except for changing the laminate constitution to one layer of the PEN layer B and not laminating the syndiotactic polystyrene layer C to obtain a biaxially oriented film of 5 μm thickness.

The characteristic of the obtained biaxially oriented film is shown in Table 8.

Comparative Example 13

The polyethylene-2,6-naphthalene dicarboxylate resin of Comparative Example 12 was changed to a polyethylene terephthalate resin and, after drying at 170° C. for 3 hours, it was supplied to an extruder heated to 280° C. and molded from a die at 290° C. into a sheet-like shape. Further, a not-stretched film cooled and solidified from the sheet by a cooling drum at a surface temperature of 20° C. was introduced to a group of rolls heated to 90° C. and, after stretching by 3.6 times in the longitudinal direction (MD direction), it was cooled by a group of rolls at 20° C.

Successively, the longitudinally stretched film was introduced while being held at both ends by clips into a tenter and stretched by 4.0 times in the direction (transverse direction) perpendicular to the longitudinal direction in an atmosphere heated to 120° C. as the highest transverse stretching temperature. Then, heat setting was applied in the tenter at 220° C. for 5 sec and, after being applied with 1% heat relaxation at 200° C., it was gradually cooled uniformly to a room temperature to obtain a biaxially oriented laminate film of 5 μm thickness.

The characteristics of the aromatic polyester resin (a) and the characteristics of the obtained biaxially oriented film are shown in Table 8.

TABLE 8

|  | Unit | Example 38 | Example 39 | Example 40 | Comparative Example 12 | Comparative Example 13 |
|---|---|---|---|---|---|---|
| Film thickness | μm | 5.0 | 5.0 | 5.0 | 5.0 | 5.0 |
| Polyolefin ratio | Wt % | 43 | 34 | 34 | — | — |
| Aromatic polyester (a) |  |  |  |  |  |  |
| Kind |  | PEN | PEN | PEN | PEN | PET |
| Melting point (Tma) | ° C. | 270 | 270 | 260 | 270 | 260 |
| Polyolefin(b) |  |  |  |  |  |  |
| Melting point (Tmb) | ° C. | 270 | 270 | 270 | — | — |
| Dielectric constant |  | 2.6 | 2.6 | 2.6 | — | — |
| Dielectric loss |  | 0.0002 | 0.0002 | 0.0002 | — | — |
| Temperature expansion coefficient | ppm/° C. | 7 | 7 | 7 | 7 | 7 |
| Humidity expansion coefficient | ppm/% RH | 6 | 7 | 7 | 12 | 12 |
| Breakdown voltage | V/μm | 500 | 480 | 460 | 400 | 450 |
| Heat resistance | ° C. | 120 | 120 | 120 | 120 | 95 |
| Film curling property | — | ○ | ○ | x | ○ | ○ |

The invention claimed is:

1. A single layered or laminated biaxially oriented film comprising a thermoplastic resin composition (c) of a polyethylene-2,6-naphthalene dicarboxylate and a syndiotactic styrene polymer having a melting point of from 230 to 280° C., wherein
the ratio of the syndiotactic styrene polymer is from 5 to 30% by weight based on the entire weight of the film, and the film thickness is from 1 to 10 μm,
wherein the breakdown voltage of the biaxially oriented film exceeds 460 V/μm and the heat resistant temperature of the biaxially oriented film is 110° C. or higher and the syndiotactic styrene polymer in the film comprising the thermoplastic resin composition (c) is dispersed in an island shape.

2. The biaxially oriented film according to claim 1, wherein the biaxially oriented film is a single layered film.

3. The biaxially oriented film according to claim 1, wherein the biaxially oriented film is a laminated film, at least one layer of said laminated film is a film layer A comprising a thermoplastic resin composition (c) of the polyethylene-2,6-naphthalene dicarboxylate and the syndiotactic styrene polymer, and a film layer B comprising the polyethylene-2,6-naphthalene dicarboxylate is laminated to at least one surface of said film layer A.

4. The biaxially oriented film according to claim 3, wherein the film layer A comprises a thermoplastic resin composition (c') of from 5 to 95% by weight of the polyethylene-2,6-naphthalene dicarboxylate and from 5 to 95% by weight of the syndiotactic styrene polymer, and the thickness of the film layer A is from 5 to 95% based on the thickness of the laminated film.

5. The biaxially oriented film according to claim 2 or 3, wherein the syndiotactic styrene polymer in the film layer comprising the thermoplastic resin composition (c) has an average length in the MD direction of 20 μm or less.

6. The biaxially oriented film according to claim 5, wherein the thermoplastic resin composition (c) further comprises a thermoplastic amorphous resin (d) having a solubility parameter between the polyethylene-2,6-naphthalene dicarboxylate and the of syndiotactic styrene polymer from 0.1 to 10% by weight based on the thermoplastic resin composition.

7. The biaxially oriented film according to claim 6, wherein the thermoplastic amorphous resin (d) is selected from the group consisting of an acrylic acid copolymerized polyolefin and a vinyl oxazoline copolymerized polyolefin resin.

8. The biaxially oriented film according to claim 3, wherein the biaxially oriented film is a three layered film wherein the film layers B are laminated on both surfaces of the film layer A.

9. The biaxially oriented film according to claim 3, wherein the number of the film layer(s) A and the film layer(s) B in total is at least four.

10. The biaxially oriented film according to claim 1, wherein the syndiotactic styrene polymer has at least one of the characteristic of a dielectric constant of less than 3.0 and a dielectric loss of less than 0.001.

11. The biaxially oriented film according to claim 1, wherein the humidity expansion coefficient in the width direction of the film is from $0.1 \times 10^{-6}$ to $13 \times 10^{-6}$%/RH %.

12. The biaxially oriented film according to claim 1, wherein the temperature expansion coefficient in the width direction of the film is from $-5 \times 10^{-6}$ to $15 \times 10^{-6}$%/° C.

13. The biaxially oriented film according to claim 1, wherein the Young's modulus both in the film forming direction and in the width direction of the film is 5 GPa or more and the total for both of them is 22 GPa at the greatest.

14. The biaxially oriented film according to any one of claims 1 or 11 to 13 capable of being used as a base film for a magnetic recording medium.

15. A magnetic recording medium comprising a biaxially oriented film according to any one of claims 1 or 11 to 13, and a magnetic layer disposed on one surface thereof.

16. The biaxially oriented film according to any one of claim 1 or claim 11 capable of being used as a base film for a film capacitor.

17. A film capacitor comprising a biaxially oriented film according to any one of claim 1 or claim 11 and a layer D comprising an oxygen atom-containing compound disposed at least on one surface thereof in which the thickness of the layer D to the entire thickness of the film and the layer D is 30% or less and the (oxygen atom/carbon atom) ratio at the surface of the layer D measured by X-ray photoelectron spectroscopy is 10% or more.

18. A film capacitor comprising a biaxially oriented film according to any one of claim 1 or claim 11 and a metal layer disposed at least on one surface thereof.

19. A single layered or laminated biaxially oriented film comprising a thermoplastic resin composition (c) of an aromatic polyester (a) and a polyolefin (b) having a melting point of from 230 to 280° C., wherein
- the ratio of the polyolefin (b) is from 2 to 60% by weight based on the entire weight of the film;
- the film thickness is from 1 to 10 μm;
- the biaxially oriented film is a single layered film;
- the polyolefin (b) in the film layer comprising the thermoplastic resin composition (c) is dispersed in an island shape and the average length thereof in the MD direction is 20 μm or less;
- the thermoplastic resin composition (c) further comprises a thermoplastic amorphous resin (d) having a solubility parameter between the aromatic polyester (a) and the polyolefin (b) of from 0.1 to 10% by weight based on the thermoplastic resin composition; and
- the thermoplastic amorphous resin (d) is selected from the group consisting of an acrylic acid copolymerized polyolefin and a vinyl oxazoline copolymerized polyolefin resin.

20. A single layered or laminated biaxially oriented film comprising a thermoplastic resin composition (c) of an aromatic polyester (a) and a polyolefin (b) having a melting point of from 230 to 280° C., wherein
- the ratio of the polyolefin (b) is from 2 to 60% by weight based on the entire weight of the film,
- the film thickness is from 1 to 10 μm;
- the biaxially oriented film is a laminated film, at least one layer of said laminated film is a film layer A comprising a thermoplastic resin composition (c) of the aromatic polyester (a) and the polyolefin (b), and a film layer B comprising the aromatic polyester (a) is laminated to at least one surface of said film layer A;
- the polyolefin (b) in the film layer comprising the thermoplastic resin composition (c) is dispersed in an island shape and the average length thereof in the MD direction is 20 μm or less;
- the thermoplastic resin composition (c) further comprises a thermoplastic amorphous resin (d) having a solubility parameter between the aromatic polyester (a) and the polyolefin (b) of from 0.1 to 10% by weight based on the thermoplastic resin composition; and
- the thermoplastic amorphous resin (d) is selected from the group consisting of an acrylic acid copolymerized polyolefin and a vinyl oxazoline copolymerized polyolefin resin.

\* \* \* \* \*